US012520026B2

(12) United States Patent
Yokosawa et al.

(10) Patent No.: US 12,520,026 B2
(45) Date of Patent: Jan. 6, 2026

(54) IMAGE PICKUP APPARATUS TO WHICH CABLE IS CONNECTED, AND CABLE CLAMP THEREFOR

(71) Applicant: CANON KABUSHIKI KAISHA, Tokyo (JP)

(72) Inventors: Masato Yokosawa, Tokyo (JP); Kazuo Yamamoto, Tokyo (JP); Yusuke Mogi, Kanagawa (JP); Kenta Ono, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 18/339,574

(22) Filed: Jun. 22, 2023

(65) Prior Publication Data

US 2023/0421882 A1 Dec. 28, 2023

(51) Int. Cl.
*H04N 23/57* (2023.01)
*H04N 23/51* (2023.01)

(52) U.S. Cl.
CPC ............. *H04N 23/57* (2023.01); *H04N 23/51* (2023.01)

(58) Field of Classification Search
CPC ............................... H04N 23/51; H04N 23/57
See application file for complete search history.

(56) References Cited

U.S. PATENT DOCUMENTS

| 9,106,816 | B1 * | 8/2015 | Hotter | F16M 11/10 |
|---|---|---|---|---|
| 2014/0354839 | A1 * | 12/2014 | Yu | F16M 13/00 |
| | | | | 348/211.99 |
| 2016/0074628 | A1 * | 3/2016 | Smith | A61B 1/0014 |
| | | | | 604/174 |
| 2018/0249133 | A1 * | 8/2018 | Thiel | G08B 25/016 |
| 2018/0275493 | A1 * | 9/2018 | Hirota | H04N 23/51 |
| 2022/0272236 | A1 * | 8/2022 | Yamagata | H04N 23/57 |

FOREIGN PATENT DOCUMENTS

JP 2006-173308 A 6/2006

* cited by examiner

*Primary Examiner* — Amy R Hsu
(74) *Attorney, Agent, or Firm* — Cowan, Liebowitz & Latman, P.C.

(57) ABSTRACT

An image pickup apparatus in which a cable is prevented from coming off a connecting terminal without requiring complicated operations. The image pickup apparatus comprising an image pickup apparatus main body, the connecting terminal provided in the image pickup apparatus main body and to which the cable is electrically connected, a grip belt that assists a user in holding the image pickup apparatus main body, and a cable clamp attachable to and detachable from the grip belt, wherein the cable clamp comprises a first holding portion that includes a U-shaped portion opened in a U shape and holds the grip belt and a second holding portion that includes a U-shaped portion opened in a U shape and holds the cable, and wherein the U-shaped portion of the first holding portion and the U-shaped portion of the second holding portion are opened in different directions.

25 Claims, 17 Drawing Sheets

2000

2000

IMAGE PICKUP APPARATUS TO WHICH CABLE IS CONNECTED, AND CABLE CLAMP THEREFOR

BACKGROUND OF THE INVENTION

Field of the Invention

The present invention relates to an image pickup apparatus and a cable clamp, and in particular to an image pickup apparatus to which a cable is connected, and a cable clamp therefor.

Description of the Related Art

It is conventionally known that in a case where a cable is used for electric connection between electronic devices, the cable is held by a cable clamp so as to prevent the cable from interfering with the operation of the electronic devices and prevent the cable from being accidentally pulled carelessly and come off a terminal accidentally.

It is known that an image pickup apparatus such as a digital camera is electrically connected to an external device by connecting a cable to an image pickup apparatus main body. It is also known that a belt member is provided on the opposite side of a display unit so that a picture can be taken with one hand. In general, there is a demand for providing wiring of a cable on a holding portion side so as to prevent the cable from hiding the display unit. A configuration in which a cable clamp is attached to the belt member is being considered as well (Japanese Laid-Open Patent Publication (Kokai) No. 2006-173308).

However, in the configuration described in Japanese Laid-Open Patent Publication (Kokai) No. 2006-173308, the belt member is needed to be put through the inside of the cable clamp, and it is not easy to attach or detach a cable. There is room for improvement from the viewpoint of making it unlikely for the cable to come off the connecting terminal.

SUMMARY OF THE INVENTION

The present invention provides an image pickup apparatus in which a cable is prevented from coming off a connecting terminal without requiring complicated operations, and a cable clamp.

Accordingly, the present invention provides an image pickup apparatus comprising an image pickup apparatus main body, a connecting terminal that is provided in the image pickup apparatus main body and to which a cable is electrically connected, a grip belt that assists a user in holding the image pickup apparatus main body, and a cable clamp capable of being attached to and detached from the grip belt, wherein the cable clamp comprises a first holding portion that includes a U-shaped portion opened in a U shape and holds the grip belt and a second holding portion that includes a U-shaped portion opened in a U shape and holds the cable, and wherein the U-shaped portion of the first holding portion and the U-shaped portion of the second holding portion are opened in different directions.

According to the present invention, the cable is prevented from coming off the connecting terminal of the image pickup apparatus without requiring complicated operations.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1A:
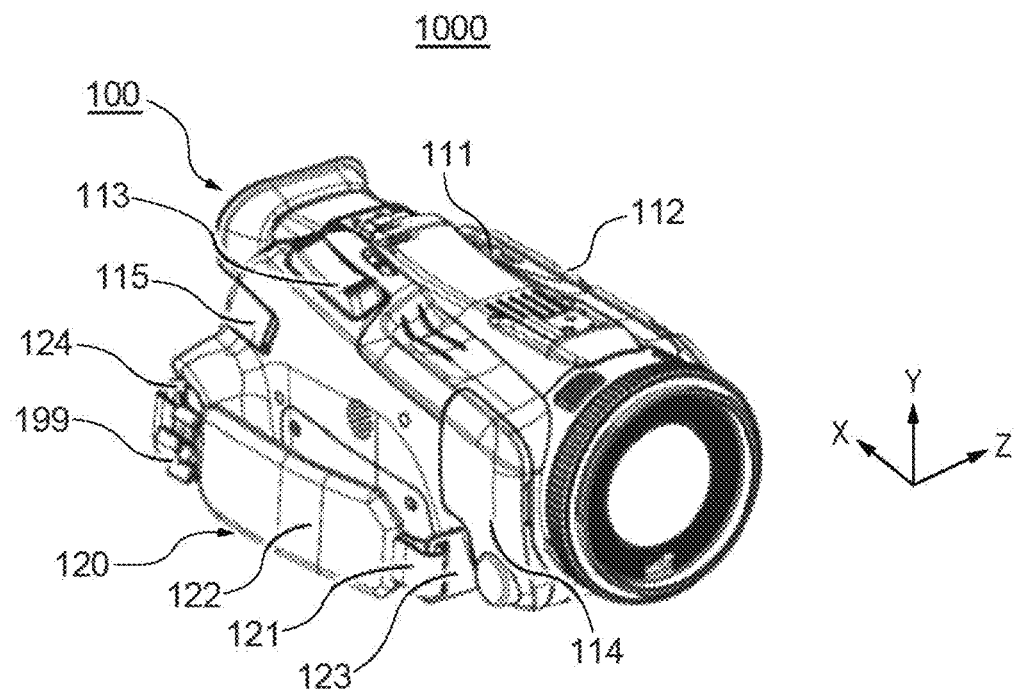
FIGS. 1A and 1B are perspective views of an image pickup apparatus according to a first embodiment.
Figure 1B:
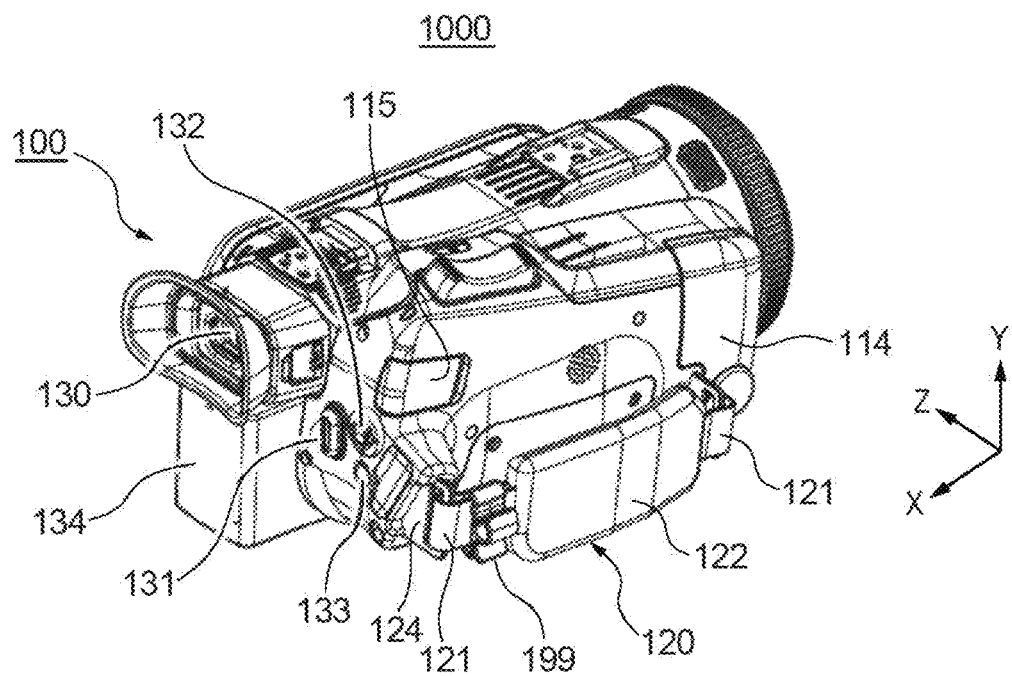

FIGS. 1A and 1B are perspective views of an image pickup apparatus 1000 according to a first embodiment of the present invention. The image pickup apparatus 1000 includes a camera main body 100 (image pickup apparatus main body), a grip belt 120, a cable clamp 199, and a battery 134.

The up-down, right-left, and front-back directions of the image pickup apparatus 1000 will hereafter be defined using an x-y-z coordinate system in each figure. An X-axis is the shooting optical axis of the camera main body 100, a −X side is a front side (subject side), and a +X side is a rear side (photographer side). On a ZY-plane perpendicular to the X-axis, a Z-axis is the width direction of the camera main body 100, and a Y-axis is the height direction of the camera main body 100. A +Z side is a right side, and a −Z side is a left side. That is, the right-left directions of the image pickup apparatus 1000 will be referred to as directions in which the camera main body 100 is seen from the subject side. A +Y side is an upper side, and a −Y side is a lower side. Thus, FIG. 1A is a perspective view showing the appearance of the image pickup apparatus 1000 as seen from the left front, and FIG. 1B is a perspective view showing the appearance of the image pickup apparatus 1000 as seen from the left rear.

The camera main body 100 has a lens unit, not shown, incorporated therein. A power switch 111, a panel display unit 112, a zoom operating unit 113, a front terminal cover 114, and a rear terminal cover 115 are disposed on the camera main body 100. The panel display unit 112 is disposed on the right side of the camera main body 100. A grip belt 120 is disposed on the left side of the camera main body 100. The cable clamp 199 detachable from the grip belt 120 is attached to the grip belt 120.

As shown in FIG. 1B, on the rear side of the camera main body 100, an eyepiece display unit 130, a shooting start button 131, a cross key 132, and a setting display button 133 are provided, and the battery 134 is mounted removably from the camera main body 100.

The grip belt 120 is comprised of a belt member 121, which is flexible, and a back-of-hand protective member 122. A front-side belt attaching portion 123 and a rear-side belt attaching portion 124 are provided on a left side of the camera main body 100. The grip belt 120 is detachably attached to the front-side belt attaching portion 123 and the rear-side belt attaching portion 124.

The grip belt 120 is attached to the front-side belt attaching portion 123 and the rear-side belt attaching portion 124 such that it connects them together. A photographer puts his or her palm through the grip belt 120 to hold the camera main body 100. That is, the grip belt 120 assists the user in holding the camera main body 100. By tightening the grip belt 120 in this state, the photographer's palm is closely attached to an external surface of the camera main body 100, and this enables the photographer to operate the zoom operating unit 113, the shooting start button 131, the cross key 132, and so forth in a stable position.

Figure 2A:
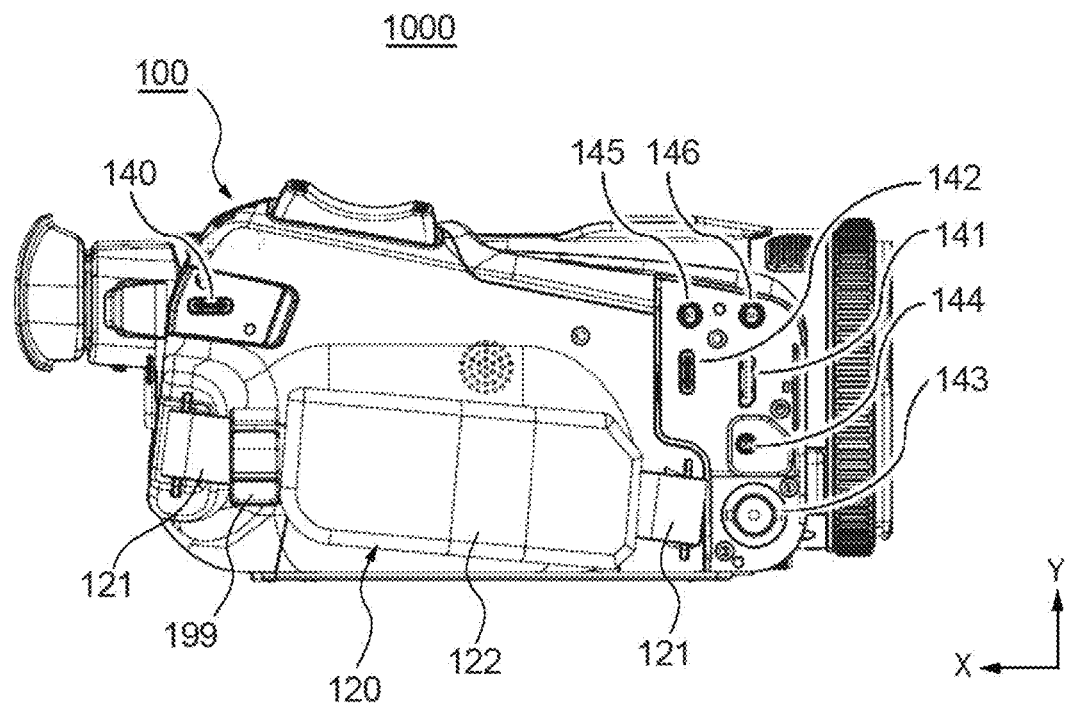
FIGS. 2A and 2B are a left side view and a perspective view, respectively, of the image pickup apparatus except a front terminal cover and a rear terminal cover.
Figure 2B:
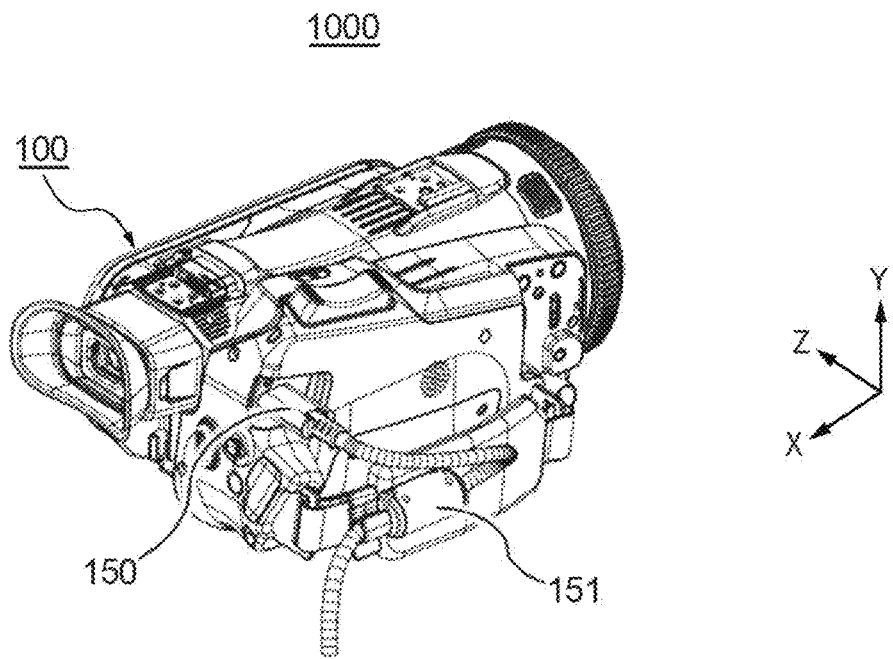

FIGS. 2A and 2B are a left side view and a perspective view, respectively, of the image pickup apparatus 1000 except the front terminal cover 114 and the rear terminal cover 115.

The camera main body 100 is provided with a power supply terminal 140, which is an electric contact. By connecting a connecting cable 150 (hereafter referred to merely as the cable 150) to the power supply terminal 140, power is supplied to the camera main body 100. A ferrite core 151, which is integrally mounted on the cable 150, is capable of reducing electromagnetic noise entering the cable 150.

It should be noted that the power supply terminal 140 is an example of a connecting terminal to which various types of cables are electrically connected, and cables to be connected to the connecting terminal are not limited to cables for supplying power. For example, a cable that electrically connects an external apparatus and the camera main body 100 together may be connected to the connecting terminal.

Next, referring to FIGS. 1A and 1B and FIGS. 2A and 2B, a description will be given of the general operation of the camera main body 100. The camera main body 100 converts a subject image entering from an object plane of the lens unit into an electric signal using an image pickup sensor (not shown) and a signal processing unit (not shown) provided inside the camera main body 100, performs image processing, and then stores it in a recording medium, not shown.

The lens unit is a zoom lens, and an internal optical member is moved by the photographer operating the zoom operating unit 113, causing the shooting angle of view to change between a wide-angle side and a telephoto side. A subject image captured by the lens unit is displayed as an image on the eyepiece display unit 130 and the panel display unit 112. Thus, by operating the zoom operating unit 113 while seeing the displayed image, the photographer is able to adjust the shooting angle of view. The photographer starts shooting by depressing the shooting start button 131 and finishes shooting by depressing the shooting start button 131 again.

The front terminal cover 114 and the rear terminal cover 115 have arm portions, not shown, made of a soft material. The arm portions are inserted toward the interior of the camera main body 100, and a hook portion is provided at an end of each arm portion. Thus, by the front terminal cover 114 and the rear terminal cover 115 being pulled out from the camera main body 100 and then their arm portions being bent, the front terminal cover 114 and the rear terminal cover 115 are caused to become freely openable and closable. The front terminal cover 114 is prevented from coming off the camera main body 100 by the hook portion provided at the end of the front terminal cover 114, and the rear terminal cover 115 is prevented from coming off the camera main body 100 by the hook portion provided at the end of the rear terminal cover 115. Each of the front terminal cover 114 and the rear terminal cover 115 is a cover member for covering a terminal that connects the camera main body 100 to an external apparatus or the like.

As shown in FIG. 2A, a first image output terminal 141, which connects to a display apparatus such as a television, is disposed in an area hidden by the front terminal cover 114, on the camera main body 100. A USB terminal 142, which connects to a PC (personal computer) or the like, a second image output terminal 143 for transmitting images over long distances, and a remote operation terminal 144 for wired remote operations, are also disposed in the area hidden by the front terminal cover 114. An audio output terminal 145, which outputs audio, and an audio input terminal 146, which connects to an external microphone, are also disposed in the area hidden by the front terminal cover 114.

The power supply terminal 140 is disposed in an area hidden by the rear terminal cover 115, on the camera main body 100. For example, as shown in FIG. 2B, by connecting the cable 150 to the power supply terminal 140, shooting can be performed continuously without using the battery 134. The camera main body 100 is capable of being connected to various apparatuses by connecting connecting cables, not shown, to the respective terminals of the camera main body 100, which extends functions of the image pickup apparatus 1000.

The cable clamp 199 is capable of sandwiching the cable 150 to prevent the cable 150 from accidentally coming off the power supply terminal 140.

Figure 3:
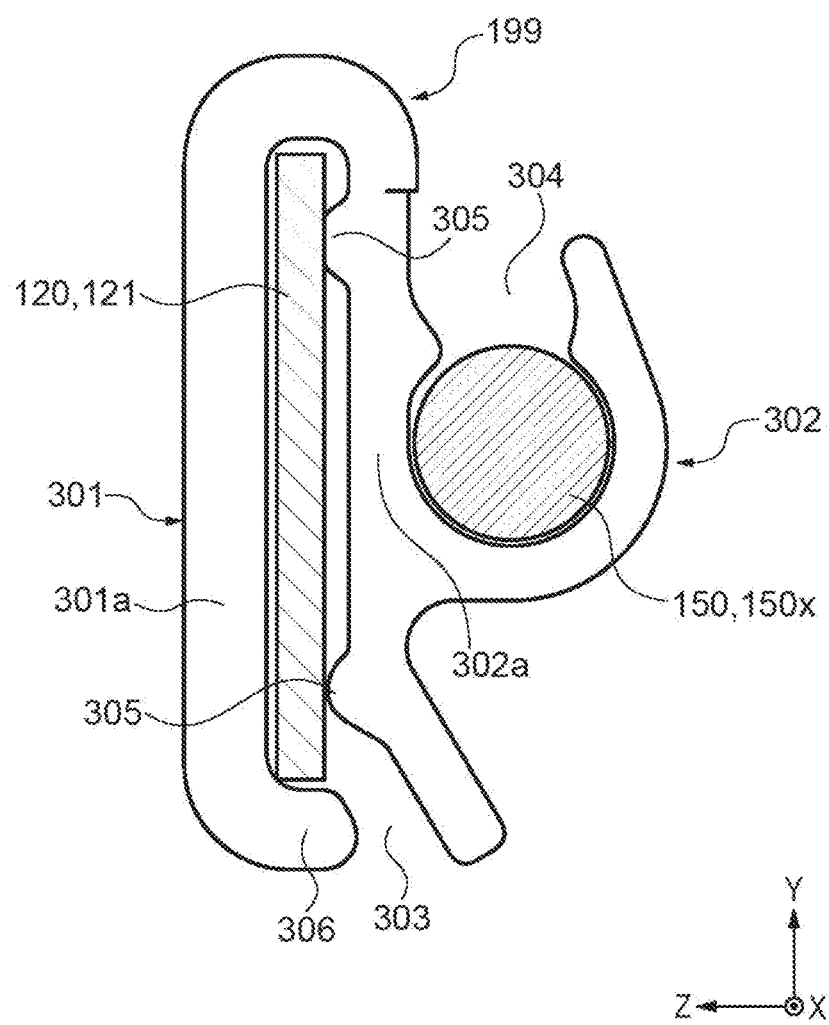
FIG. 3 is a view of a cable clamp as seen from a +X side.

FIG. 3 is a view of the cable clamp 199 as seen from the +X side. The cable clamp 199 includes a grip belt holding portion 301 (first holding portion), which is capable of holding the grip belt 120, and a cable holding portion 302 (second holding portion), which is capable of holding the cable 150. The cable clamp 199 is configured as an integral unit made of metal, resin, or the like, but may be formed by assembling separate components.

A portion (U-shaped portion) of the grip belt holding portion 301 which is opened in a U shape includes a grip belt insertion opening 303. The grip belt insertion opening 303 is an opening through which the belt member 121 of the grip belt 120 is inserted.

The grip belt holding portion 301 has a first wall 301*a* on a side (+Z side) close to the camera main body 100 and a second wall 302*a* on a side (−Z side) far from the camera main body 100. The first wall 301*a* and the second wall 302*a* form the U shape. A space between the first wall 301*a* and the second wall 302*a* in the U shape is substantially rectangular, wherein the width of the said space in the direction of the Z axis is substantially the same as the width of the belt member 121 and slightly larger than the width of the belt member 121. This space connects to the outside through the grip belt insertion opening 303.

The grip belt insertion opening 303 is opened in a direction (orientation) including a component in −Y direction and a component in a −Z direction. Namely, the grip belt insertion opening 303 is tilted with respect to the direction of the width (the direction of the Y-axis) of a part of the belt member 121, which is held by the grip belt holding portion 301, and opened in a direction (orientation) including a component in a direction away from the camera main body 100. An end of the first wall 301a on the −Y side is formed as a grip belt receiving portion 306 bent in a direction (−Z direction) away from the camera main body 100. Due to the shape of the grip belt receiving portion 306, the belt member 121 is unlikely to come off the grip belt holding portion 301.

A portion (U-shaped portion) of the cable holding portion 302 which is opened in a U shape includes a cable insertion opening 304. The cable insertion opening 304 is an opening through which the cable 150 is inserted. The cable holding portion 302 is connected to the second wall 302a. The cable holding portion 302 is formed in an arc shape, and a space surrounded by the arc shape has substantially the same curvature radius as that of a main held portion 150x of the cable 150. This space connects to the outside through the cable insertion opening 304. The cable insertion opening 304 is opened in a +Y direction. The width of the cable insertion opening 304 is smaller than the diameter of the main held portion 150x of the cable 150.

As described above, the grip belt insertion opening 303 is opened in substantially the −Y direction, and the cable insertion opening 304 is opened in the +Y direction. That is, the grip belt insertion opening 303 and the cable insertion opening 304 are opened on substantially the opposite sides. As a result, when the cable 150 is pulled downward (the −Y direction), the grip belt 120 is unlikely to come off the grip belt holding portion 301, and the cable 150 is unlikely to come off the cable holding portion 302. It should be noted that this effect will be achieved even if a configuration in which the grip belt insertion opening 303 is opened in the −Y direction is adopted.

The second wall 302a also includes convex portions 305 as convex portions projecting toward the +Z side for preventing the cable clamp 199 from wobbling. The number of convex portions 305 provided in the present embodiment is two, but the number of convex portions 305 is not limitative. The grip belt 120 held by the grip belt holding portion 301 is pushed by the convex portions 305 to prevent the cable clamp 199 from wobbling.

In the direction of the Z axis, an end of the grip belt receiving portion 306 is located away from the camera main body 100 (that is, located on the −Z side) as compared to ends of the convex portion 305. That is, as viewed from the Y-axis direction, the grip belt receiving portion 306 and the convex portions 305 overlap each other in the Z-axis direction. Because of this configuration, even when the cable 150 is pulled in a direction (the −Z direction) away from the camera main body 100, the grip belt 120 is unlikely to come off the cable clamp 199.

Figure 4:
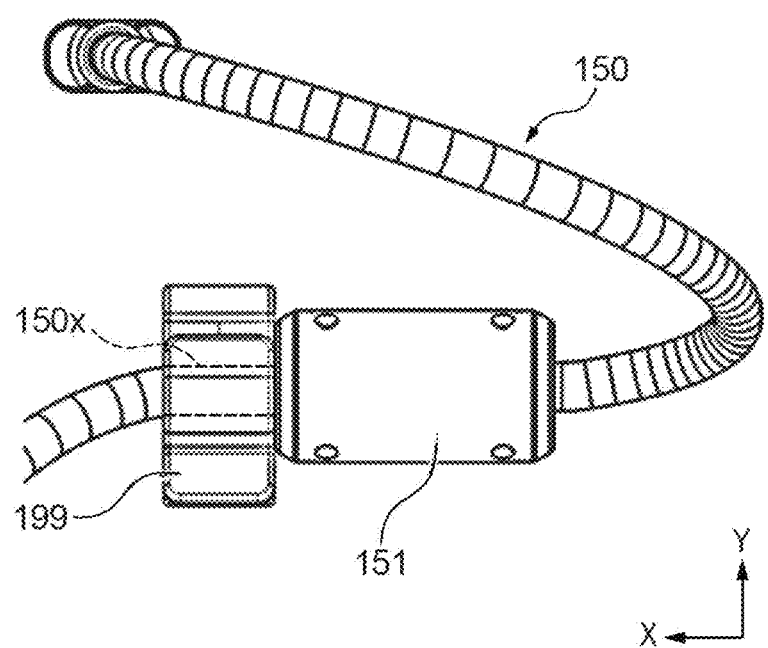
FIG. 4 is a view of a state where a cable is held by the cable clamp.

FIG. 4 is a view showing a state where the cable 150 is held by the cable clamp 199. The main held portion 150x is a main portion, of the cable 150, which is held by the cable holding portion 302. A direction in which a portion (the belt member 121) of the grip belt 120 which is held by the grip belt holding portion 301 is extended and a direction in which a portion (the main held portion 150x) of the cable 150 which is held by the cable holding portion 302 is extended are substantially parallel to each other.

The ferrite core 151 is a portion that is thicker than a portion (for example, the main held portion 150x) held by the cable holding portion 302. In other words, the diameter of the ferrite core 151 is larger than the diameter of the main held portion 150x.

Thus, when the cable 150 is pulled, by an external force, in a direction in which the cable 150 is wired (i.e., the direction in which the main held portion 150x is extended), and more particularly in the +X direction, the ferrite core 151 is caught on (abuts against) the cable clamp 199. Namely, the movement of the cable 150 in the direction in which the cable 150 is extended is restricted with respect to the cable holding portion 302, and hence the cable 150 is prevented from accidentally coming off the camera main body 100.

According to the present embodiment, the grip belt holding portion 301 of the cable clamp 199 includes the grip belt insertion opening 303 opened in the U shape. By the user inserting the grip belt 120 into the grip belt holding portion 301 through the grip belt insertion opening 303, the grip belt holding portion 301 is caused to hold the grip belt 120. Thus, the cable clamp 199 is mounted on the grip belt 120. The cable holding portion 302 of the cable clamp 199 includes the cable insertion opening 304 opened in the U shape. By the user inserting the cable 150 into the cable holding portion 302 through the cable insertion opening 304, the cable holding portion 302 is caused to hold the cable 150. Thus, the user is able to mount the cable clamp 199 on the grip belt 120 and cause the cable clamp 199 to hold the cable 150, without complicated operations.

Therefore, the cable 150 is prevented from coming off the power supply terminal 140 without complicated operations required.

In particular, the grip belt insertion opening 303 and the cable insertion opening 304 are opened in the different directions. For this reason, even when the cable 150 is subjected to an external force, the cable clamp 199 is unlikely to come off the grip belt 120, and the cable 150 is unlikely to come off the cable clamp 199.

Moreover, since the second wall 302a is provided with the convex portions 305 projecting toward the +Z side, the cable clamp 199 is prevented from wobbling.

Furthermore, the grip belt insertion opening 303 is opened in a manner tilting toward the −Z side with respect to the Y-axis direction, and the end of the first wall 301a on the −Y side is formed as the grip belt receiving portion 306 bent in the −Z direction. Moreover, in the Z-axis direction, the end of the grip belt receiving portion 306 is located away from the camera main body 100 (located on the −Z side) as compared to the ends of the convex portions 305. Because of this configuration, the belt member 121 is more reliably prevented from coming off the grip belt holding portion 301.

In addition, even when the cable 150 is pulled by an external force in the direction in which the main held portion 150x is extended, the ferrite core 151 abuts against the cable clamp 199, and hence the cable 150 is more reliably prevented from coming off the power supply terminal 140.

Figure 5:
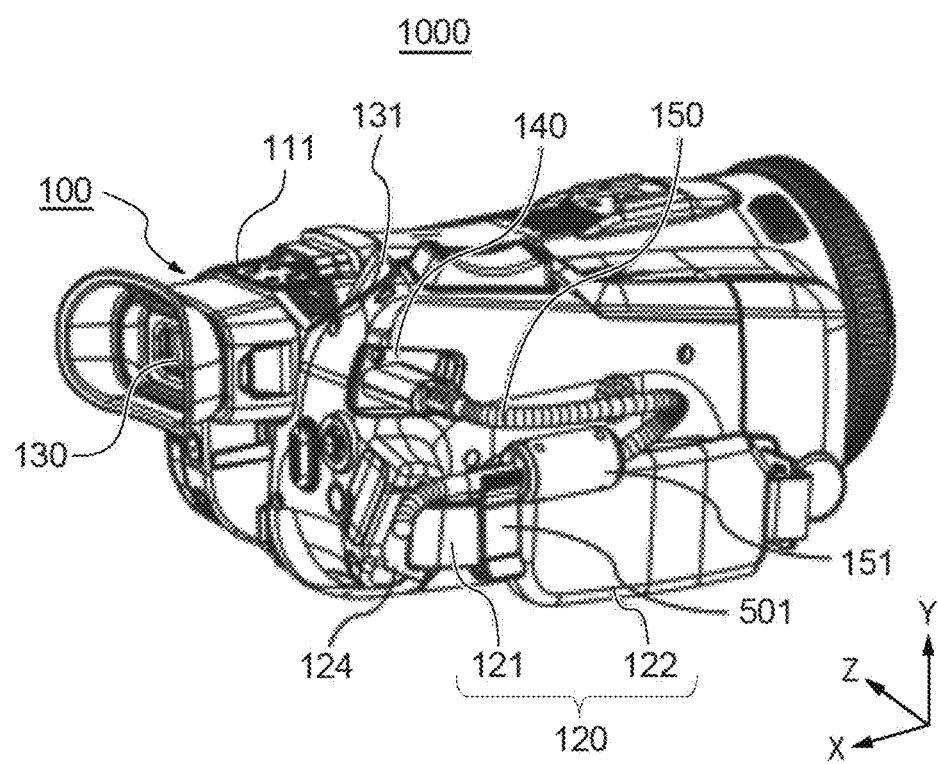
FIG. 5 is a perspective view of an image pickup apparatus according to a second embodiment.

FIG. 5 is a perspective view of an image pickup apparatus 1000 according to a second embodiment of the present invention. In the second embodiment, a cable clamp 501 is adopted in place of the cable clamp 199 according to the first embodiment.

Figure 6A:
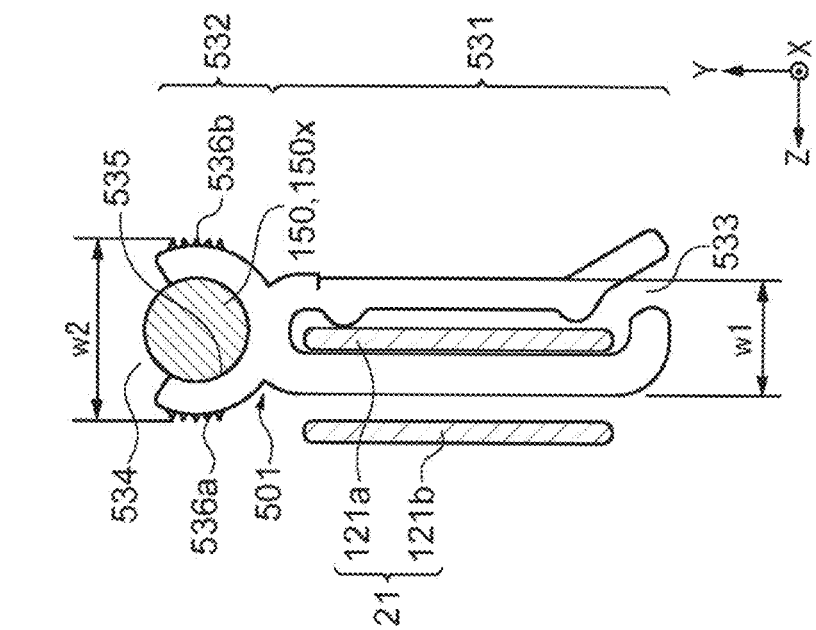
FIGS. 6A to 6C are views showing the appearance of a cable clamp, i.e., a perspective view of the cable clamp, a view of the cable clamp as seen from an +X side, and a view of a state where a cable and a belt member are held by the cable clamp as seen from the +X side, respectively.
Figure 6B:
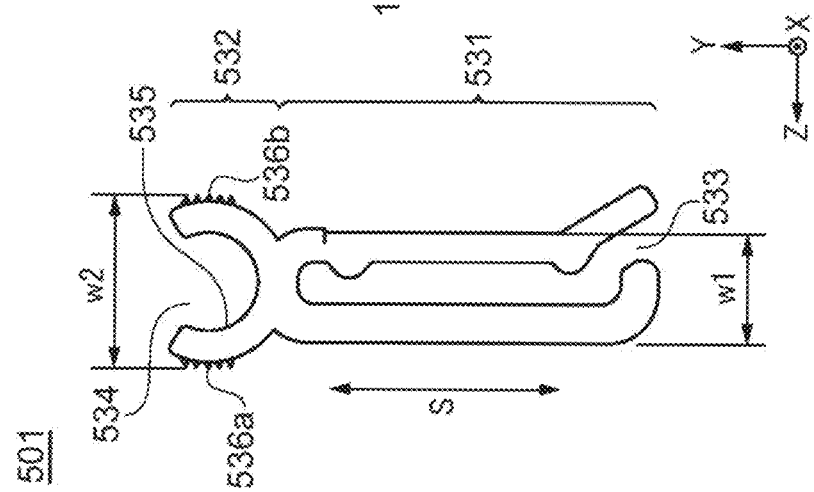
Figure 6C:
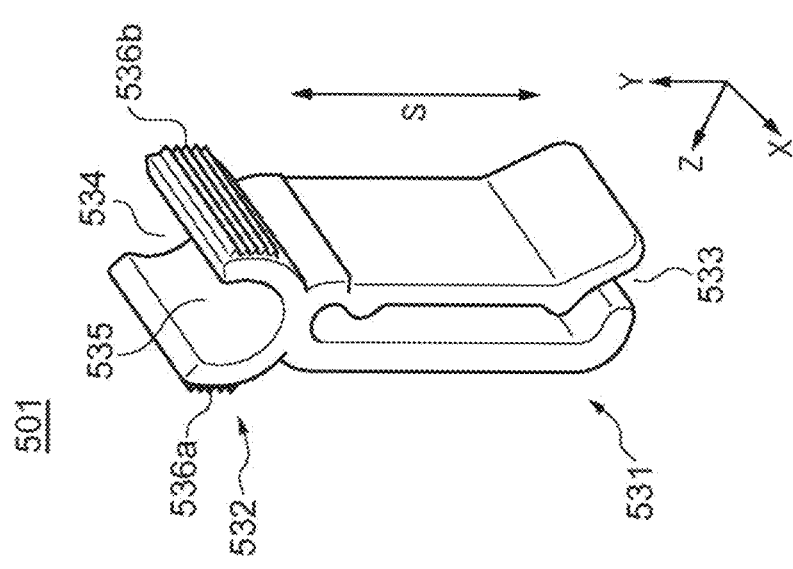

FIGS. 6A to 6C are views showing the appearance of the cable clamp 501. FIG. 6A is a perspective view of the cable clamp 501. FIG. 6B is a view of the cable clamp 501 as seen from the +X side. FIG. 6C is a view of a state where the cable 150 and the belt member 121 are held by the cable clamp 501 as seen from the +X side.

As shown in FIGS. 6A to 6C, the cable clamp 501 includes a grip belt sandwiching portion 531 (first holding portion) in place of the grip belt holding portion 301 of the cable clamp 199 according to the first embodiment. Further, the cable clamp 501 includes a cable sandwiching portion 532 (second holding portion) in place of the cable holding portion 302 according to the first embodiment.

The belt member 121 of the grip belt 120 includes a first belt portion 121*a* and a second belt portion 121*b*. The belt member 121 is one continuous member. The belt member 121 is folded back at the rear-side belt mounting portion 124 of the camera main body 100, and both ends of the belt member 121 are housed in the back-of-hand protective member 122. Referring to FIG. 6C, the first belt portion 121*a* is sandwiched by the grip belt sandwiching portion 531 in a space in the grip belt sandwiching portion 531 which is surrounded by a U shape (an area surrounded by the U shape), and in the direction of the Z axis, the second belt portion 121*b* is located between the grip belt sandwiching portion 531 and the camera main body 100. The cable 150 is sandwiched by the cable sandwiching portion 532.

The cable clamp 501 is made of, for example, a resin material and comprised of integral two U shapes that form the grip belt sandwiching portion 531 and the cable sandwiching portion 532. The grip belt sandwiching portion 531 has a length in the direction of the Y axis and a width in the direction of the Z axis enough to sandwich the first belt portion 121*a*.

As for the configuration that forms the U shape, the basic configuration of the grip belt sandwiching portion 531 is similar to that of the grip belt holding portion 301. A portion of the grip belt sandwiching portion 531 which is opened in the U shape includes a grip belt-side opening 533. A direction in which the grip belt-side opening 533 is opened is similar to the direction in which the grip belt insertion opening 303 (FIG. 3) is opened. The grip belt sandwiching portion 531 has a shape similar to the shape of the grip belt receiving portion 306 and the convex portions 305 (FIG. 3). By inserting the first belt portion 121*a* into the grip belt sandwiching portion 531 through the grip belt-side opening 533, the user is able to mount the cable clamp 501 on the grip belt 120 as shown in FIG. 5C.

A portion of the cable sandwiching portion 532 which is opened in the U shape includes a cable-side opening 534. The cable-side opening 534, which is an opening through which the cable 150 is inserted, is opened in the +Y direction.

An inner surface 535 of the U shape of the cable sandwiching portion 532 has a size enough to sandwich the cable 150. The curvature radius of the main held portion 150*x* of the cable 150 is substantially the same as that of the inner surface 535. It should be noted that each of the shape of the cable 150 and the shape of the inner surface 535 should not always be round, but may be, for example, oval.

By inserting the cable 150 into the cable sandwiching portion 532 through the cable-side opening 534, the user is able to mount the cable 150 on the cable clamp 501 as shown in FIG. 5C.

Here, the longitudinal direction S of the cross section of the first belt portion 121*a* is the width direction of a portion of the belt member 121 of the grip belt 120 which is held by the grip belt sandwiching portion 531, and is parallel to the direction of the Y axis. The cable sandwiching portion 532 is connected to the bottom (+Y side) of "U" of the U shape of the grip belt sandwiching portion 531 in the direction of the Y axis. In other words, the grip belt sandwiching portion 531 and the cable sandwiching portion 532 are disposed side by side in the direction of the Y axis. This reduces the increase in the width of the image pickup apparatus 1000. Namely, even when the cable 150 is sandwiched by the cable sandwiching portion 532, the outer shape of the image pickup apparatus 1000 never significantly increases in the direction of the width (the direction of the Z axis).

The outer shape of the entire image pickup apparatus 1000 in the state where the cable 150 is connected to the camera main body 100 is one of factors that determines whether or not the image pickup apparatus 1000 can be mounted on external accessories for a rig, a drone, and so forth. Since the outer shape of the entire image pickup apparatus 1000 increases only a little even in a case where the cable clamp 501 is mounted on the image pickup apparatus 1000, the decrease in the possibility that the image pickup apparatus 1000 will be mounted on the external accessories can be reduced.

The grip belt-side opening 533 and the cable-side opening 534 are opened on substantially the opposite sides. Therefore, when the cable 150 is pulled downward (the −Y direction), the first belt portion 121*a* is unlikely to come off the grip belt sandwiching portion 531, and the cable 150 is unlikely to come off the cable sandwiching portion 532.

Moreover, as with the first embodiment, when the cable 150 is pulled in the +X direction, the ferrite core 151 is caught on (abutted against) the cable clamp 501. As a result, the cable 150 is prevented from accidentally coming off the camera main body 100.

Finger hook portions 536*a* (+Z side) and 536*b* (−Z side) each with a bellows-like shape with concave-convex shape are provided on an outer side portion of the cable sandwiching portion 532. By holding the finger hook portions 536*a* and 536*b*, the user can easily attach and detach the cable 150 to and from the cable 150 and attach and detach the cable clamp 501 itself to and from the grip belt 120. It should be noted that since the cable sandwiching portion 532 is located on the +Y side of the grip belt sandwiching portion 531, the finger hook portions 536*a* and 536*b* can be provided on both the +Z side and the −Z side in the outer side portion of the cable sandwiching portion 532.

As shown in FIG. 6B, in the direction of the thickness of the first belt portion 121*a* (the direction of the Z axis), the maximum outer diameter w2 of the cable sandwiching portion 532 is larger than the maximum outer diameter w1 of the main part of the grip belt sandwiching portion 531 (w1<w2). Thus, the user can easily hold the finger hook portions 536*a* and 536*b*, and hence easily remove the cable clamp 501 from the grip belt 120.

According to the present embodiment, the effect similar to the effect of the first embodiment can be achieved in terms of preventing the cable 150 from coming off the power supply terminal 140 without complicated operations required.

Moreover, since the grip belt sandwiching portion 531 and the cable sandwiching portion 532 are disposed side by side in the direction of the Y axis, the increase in the width of the image pickup apparatus 1000 in the direction of the Z axis can be reduced.

In addition, the hook portions 536*a* and 536*b* having the concave-convex shape are provided on both of the outer sides of the cable sandwiching portion 532 in the direction of the Z axis, which makes it easy to perform operations which require a user to hold the cable sandwiching portion 532.

Referring to FIGS. 7A and 7B and FIGS. 8A and 8B, a description will now be given of a first variation and a second variation of the cable clamp 501 according to the present embodiment.

Figure 7A:
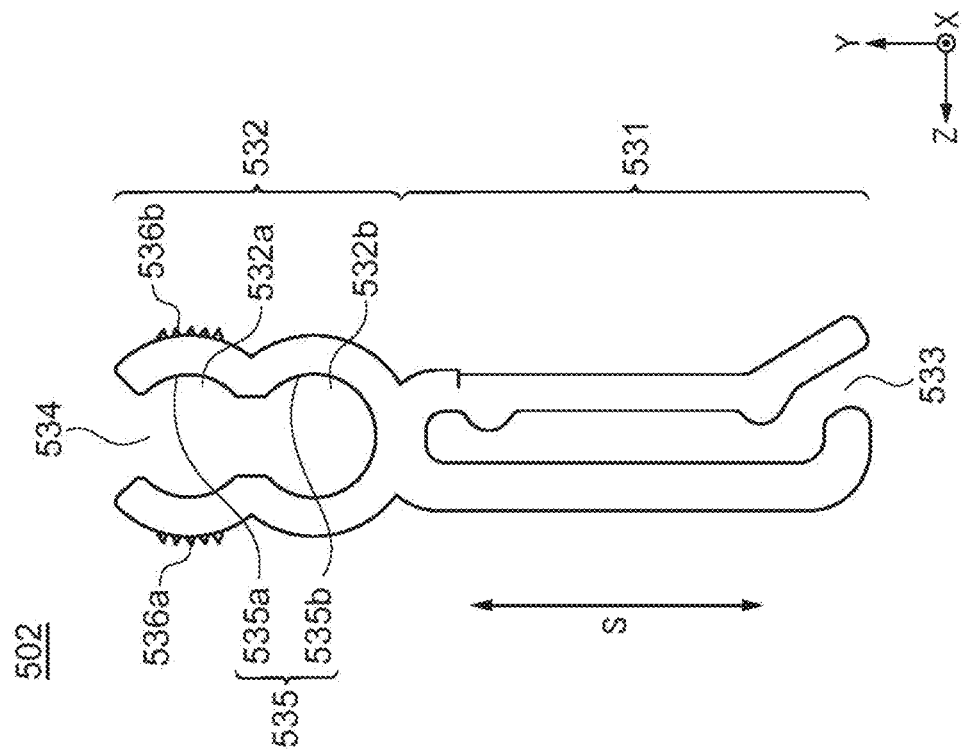
FIGS. 7A and 7B are views useful in explaining a variation of the cable clamp.
Figure 7B:
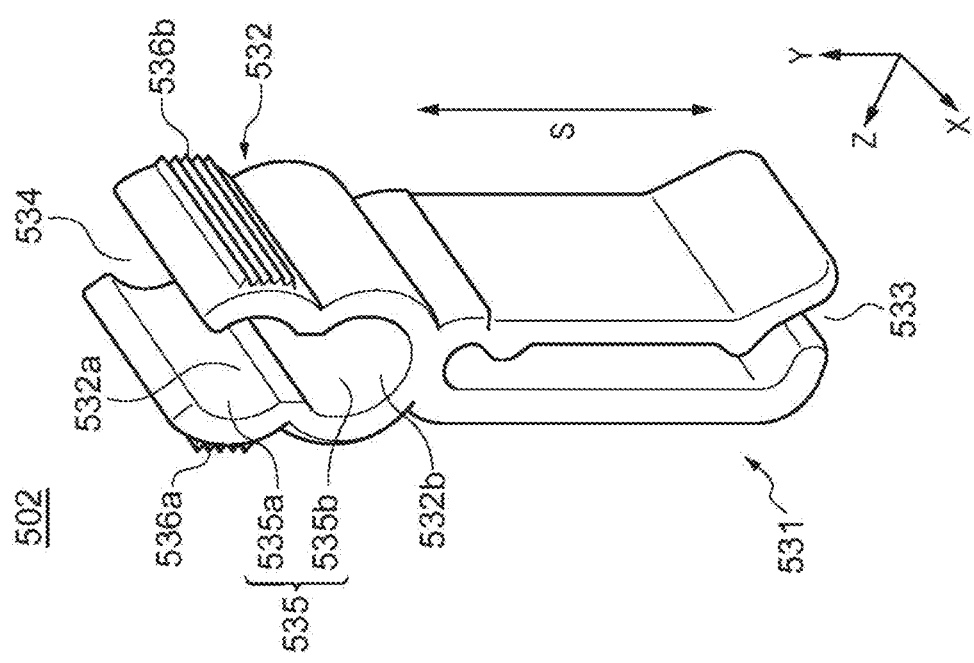

FIG. 7A is a perspective view of a cable clamp 502 which is the first variation, and FIG. 7B is a view of the cable clamp 502 in FIG. 7A as seen from the +X side. The cable sandwiching portion 532 of the cable clamp 502 has a first holding area 532*a* and a second holding area 532*b* as a plurality of areas for holding a cable. An inner side 535 is comprised of a plurality of arc inner sides 535*a* and 535*b* to form the first holding area 532*a* and the second holding area 532*b*. This configuration enables two cables such as the cable 150 to be sandwiched at the same time.

The first holding area 532*a* and the second holding area 532*b* are disposed side by side in a longitudinal direction S. Thus, even in a case where a plurality of cables is sandwiched at the same time, the increase in the outer shape of the image pickup apparatus 1000 in the direction of the Z axis can be reduced.

The two areas, i.e., the first holding area 532*a* and the second holding area 532*b* share one cable-side opening 534. This enables the user to attach and detach two cables collectively. This configuration is convenient, for example, in a case where two cables related to each other such as the left channel and the right channel of a stereo microphone are handled at the same time.

It should be noted that although the finger hook portions 536*a* and 536*b* are provided on an outer side corresponding to the first holding area 532*a*, the finger hook portions 536*a* and 536*b* may be provided on an outer side corresponding to the second holding area 532*b*.

Figure 8A:
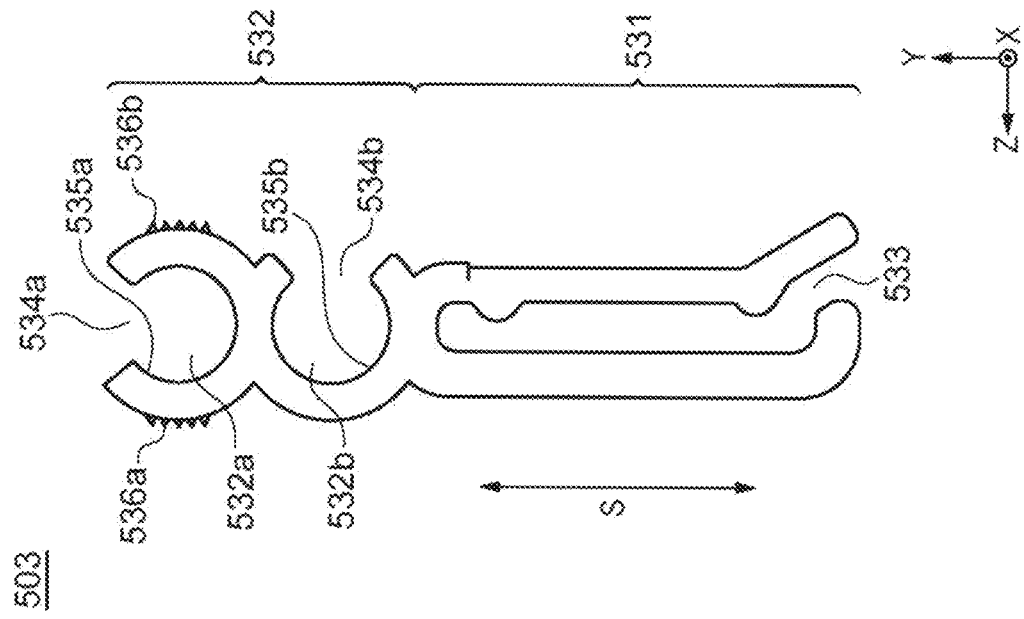
FIGS. 8A and 8B are views useful in explaining a variation of the cable clamp.
Figure 8B:
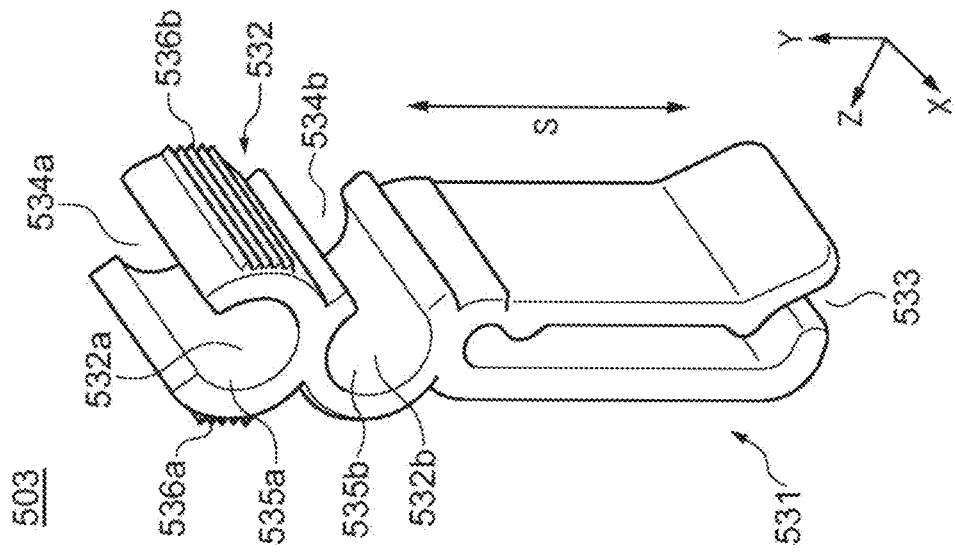

FIG. 8A is a perspective view of a cable clamp 503 which is the second variation, and FIG. 8B is a view of the cable clamp 503 in FIG. 8A as seen from the +X side. The second variation differs from the first variation in that in the cable clamp 503, a first opening 534*a* and a second opening 534*b* are separately provided as cable-side openings, respectively for the first holding area 532*a* and the second holding area 532*b*. Thus, when the user attaches or detaches one of two cables, the attachment or detachment is not restricted by the sandwiching state of the other cable, and hence the two cables can be attached or detached in an arbitrary order. This configuration is convenient, for example, in a case where a plurality of unrelated cables is handled.

It should be noted that in the second variation, the first opening 534*a* is opened on substantially the opposite side to the grip belt side opening 533. This ensures the effect of preventing a cable from coming off the cable sandwiching portion 532.

It should be noted that although in the second variation, the second opening 534*b* is opened in the −Z direction, the second opening 534*b* may be opened in such an arbitrary direction that a cable can be attached and detached. It should be noted that in the first variation and the second variation, the number of continuous holding areas may be three or more.

It should be noted that also in the first embodiment, the first belt portion 121*a* may be sandwiched in the space in the grip belt holding portion 301 which is surrounded by the U shape, and in the direction of the Z axis, the second belt portion 121*b* may be located between the grip belt holding portion 301 and the camera main body 100.

Figure 9:
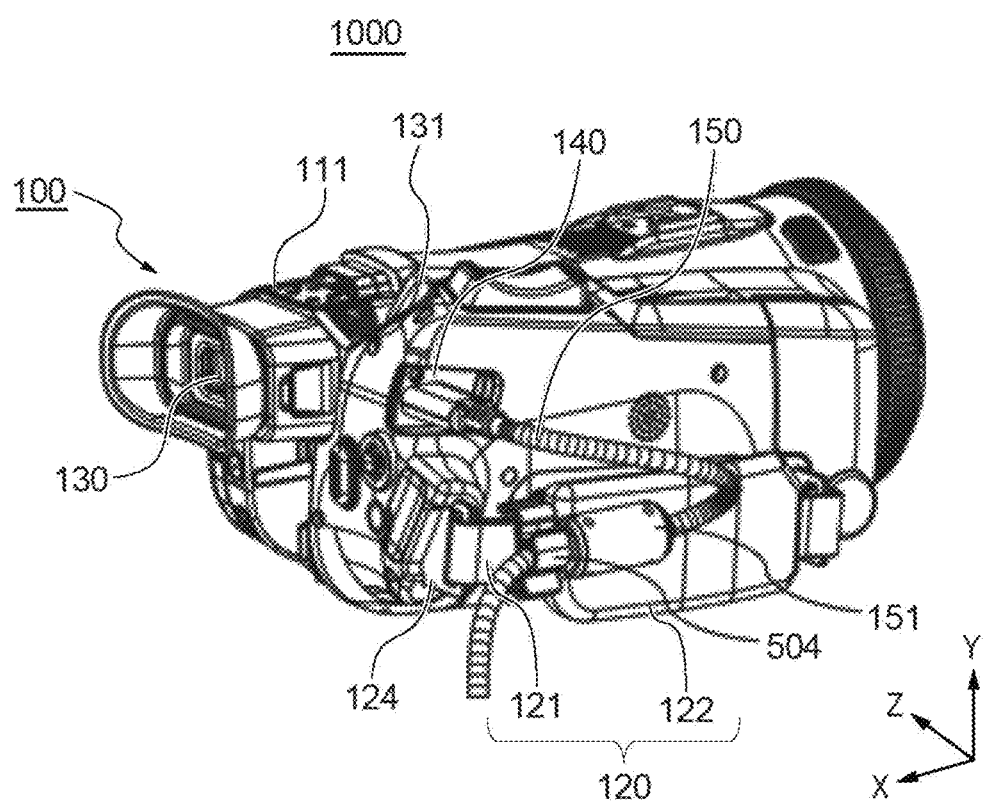
FIG. 9 is a perspective view of an image pickup apparatus according to a third embodiment.

FIG. 9 is a perspective view of an image pickup apparatus 1000 according to a third embodiment of the present invention. In the present embodiment, a cable clamp 504 is adopted in place of the cable clamp 199 according to the first embodiment.

Figure 10A:
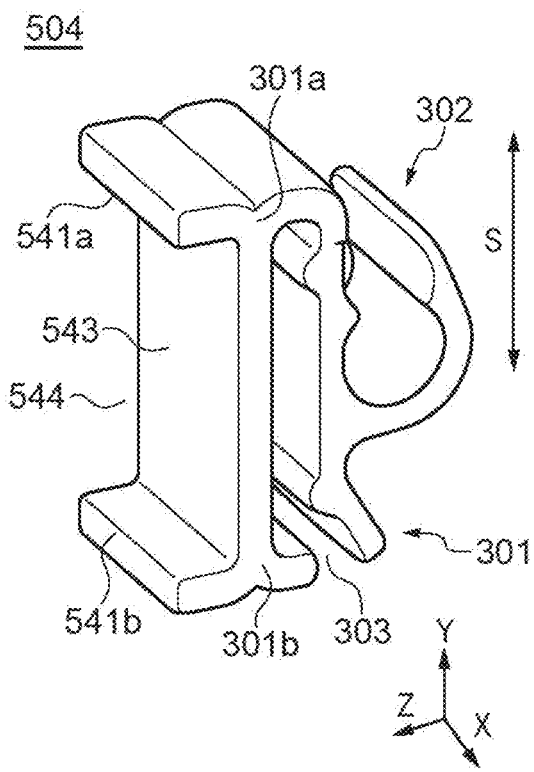
FIGS. 10A to 10C are views showing the appearance of a cable clamp, i.e., a perspective view of the cable clamp, a view of the cable clamp as seen from a +X side, and a view of a state where a cable and a belt member are held by the cable clamp as seen from the +X side, respectively.
Figure 10B:
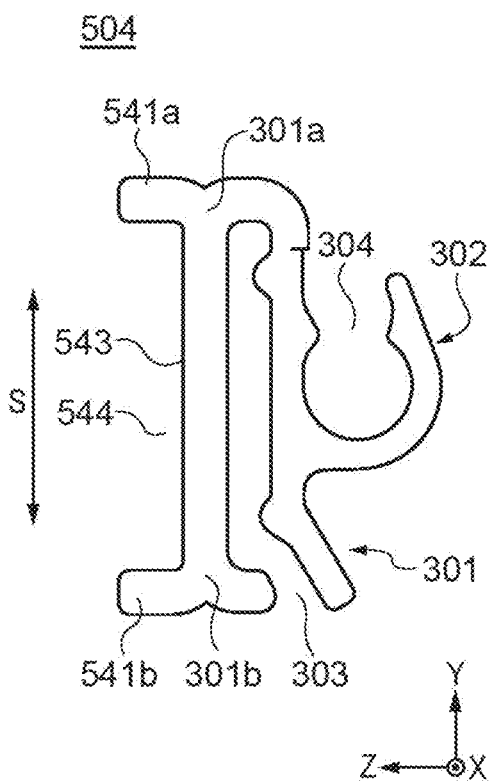
Figure 10C:
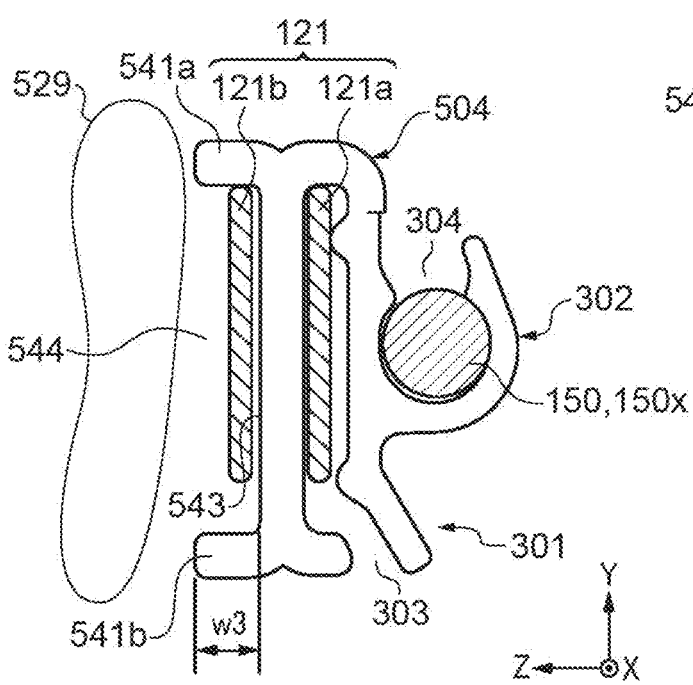

FIGS. 10A to 10C are views showing the appearance of the cable clamp 504. FIG. 10A is a perspective view of the cable clamp 504. FIG. 10B is a view of the cable clamp 504 as seen from the +X side. FIG. 10C is a view of a state where the cable 150 and the belt member 121 are held by the cable clamp 504 as seen from the +X side.

The cable clamp 504 is made of, for example, a resin material. In the cable clamp 504, the basic configuration of the grip belt holding portion 301 and the cable holding portion 302 are similar to that in the cable clamp 199 (FIG. 3). That is, the positional relationship between the grip belt holding portion 301 and the cable holding portion 302 and the direction in which the grip belt insertion openings 303 is opened and the direction in which the cable insertion opening 304 is opened are also similar to those of the cable clamp 199. The cable clamp 504 differs from the cable clamp 199 (FIG. 3) in that the grip belt holding portion 301 is provided with a first bent portion 541*a* and a second bent portion 541*b*.

It should be noted that in the present embodiment, as an example, the first belt portion 121*a* is sandwiched in the space in the grip belt holding portion 301 which is surrounded by the U shape, and in the direction of the Z axis, the second belt portion 121*b* is located between the grip belt holding portion 301 and the camera main body 100 (FIG. 10C).

The longitudinal direction S of the cross section of the first belt portion 121*a* is the direction of the width of the portion of the belt member 121 which is held by the grip belt holding portion 301, and is parallel to the direction of the Y axis. In the longitudinal direction S, an end of the grip belt holding portion 301 on the +Y side is a first end 301*a*, and an end of the grip belt holding portion 301 on the −Y side is a second end 301*b*. The first end 301*a* is provided with a first bent portion 541*a* bent in such a direction approaching the camera main body 100 (bent toward the +Z direction). The second end 301*b* is provided with a second bent portion 541*b* bent in such a direction approaching the camera main body 100 (bent toward the +Z direction). The grip belt holding portion 301 has an opposing surface 543 opposed to the camera main body 100. It should be noted that the distance between the first bent portion 541*a* and the second bent portion 541*b* is larger than the width of the belt member 121 in the direction of the Y axis.

The first belt portion 121*a*, which is a part of the grip belt 120, is inserted through the grip insertion opening 303 and held in the space surrounded by the U shape in the grip belt holding portion 301. The second belt portion 121*b*, which is another part of the grip belt 120, is located between the first bent portion 541*a* and the second bent portion 541*b* in the direction of the Y axis and located between the opposing surface 543 and the camera main body 100 in the direction of the Z axis. Thus, the belt member 121 is held by the grip belt holding portion 301. Here, a space inside a substantially C shape formed by the first bent portion 541*a*, the second bent portion 541*b*, and the opposing surface 543 is referred to as a grip belt housing 544. The second belt portion 121*b* is housed in the grip belt housing 544. This reduces the displacement in the direction of the Y axis of the second belt portion 121*b* with respect to the grip belt holding portion 301.

The user inserts the first belt portion 121a into the grip belt holding portion 301 through the grip insertion opening 303, while inserting the second belt portion 121b into the grip belt housing 544 from the +Z side. Thus, the cable clamp 504 is mounted on the grip belt 120 (FIG. 10C). In FIG. 10C, a hand 529 of the user is inserted between the grip belt 120 and the camera main body 100.

As described above, the first belt portion 121a is sandwiched by the U-shaped portion (the space surrounded by the U shape) of the grip belt holding portion 301, and further the second belt portion 121b is housed in the grip belt housing 544. This reduces the displacement of the second belt portion 121b in the longitudinal direction S. Thus, even if an undesired force is applied to the cable clamp 504 when, for example, the user inserts or removes the hand 529 into or from the grip belt 120, the cable clamp 504 and the belt member 121 are unlikely to come off each other. Moreover, even if an unintended force is applied to the cable clamp 504 when, for example, the cable 150 is pulled, the cable clamp 504 and the belt member 121 are unlikely to come off each other.

It should be noted that both the first belt portion 121a and the second belt portion 121b may be collectively sandwiched by the U-shaped portion (the space surrounded by the U shape) of the grip belt holding portion 301. In this case, however, the belt portions 121a and 121b may become displaced with respect to each other when the belt member 121 is attached to or detached from the grip belt holding portion 301. It is thus preferred that the second belt portion 121b is housed in the grip belt housing 544 as shown in FIG. 10C.

In in the direction of the Z axis, the projecting amount w3 (FIG. 10C) of the bent portions 541a and 541b is preferably larger than the thickness of the second belt portion 121b. This improves the effect of reducing the displacement of the belt member 121 in the direction of the Y axis.

According to the present embodiment, the effect similar to the effect of the first embodiment can be achieved in terms of preventing the cable 150 from coming off the power supply terminal 140 without complicated operations required.

Moreover, since the second belt portion 121b is housed in the grip belt housing 544, the second belt portion 121b is prevented from becoming displaced with respect to the grip belt holding portion 301 in the direction of the Y axis.

It should be noted that from the viewpoint of stably housing the second belt portion 121b in the grip belt housing 544, the shapes of the bent portions 541a and 541b are not limited to those illustrated in FIGS. 10A to 10C. For example, the distance (the direction of the Y axis) between the opposing surfaces of the bent portions 541a and 541b may be decreased as they go to the +Z side. Alternatively, an end of at least one of the bent portions 541a and 541b may have a hook shape to cover a part of the housed belt portion 121b from the +Z side.

Referring to FIGS. 11A to 11D, a description will now be given of a variation of the cable clamp 504 according to the present embodiment.

Figure 11A:
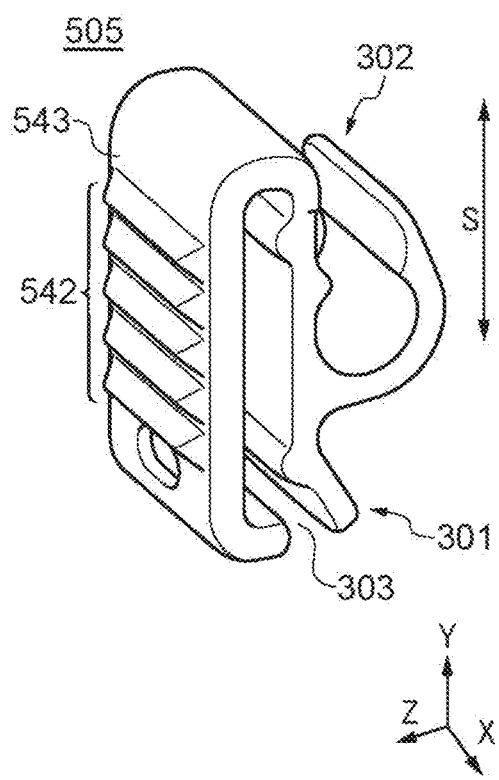
FIGS. 11A to 11D are views showing a variation of the cable clamp.
Figure 11B:
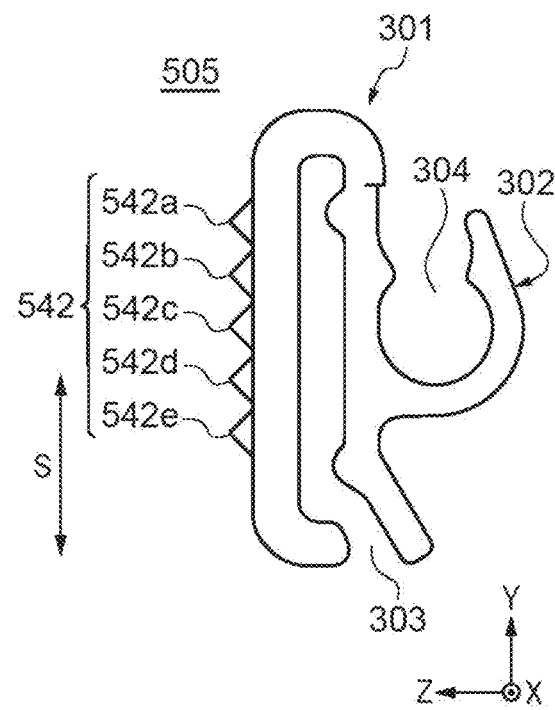
Figure 11C:
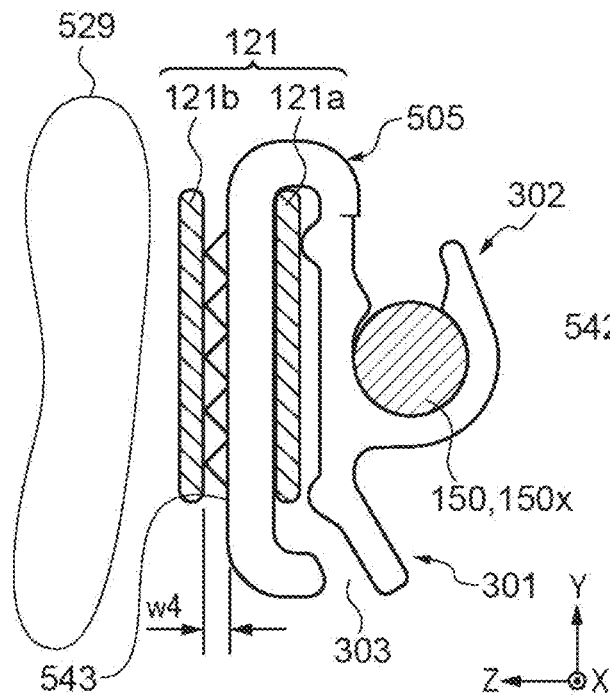
Figure 11D:
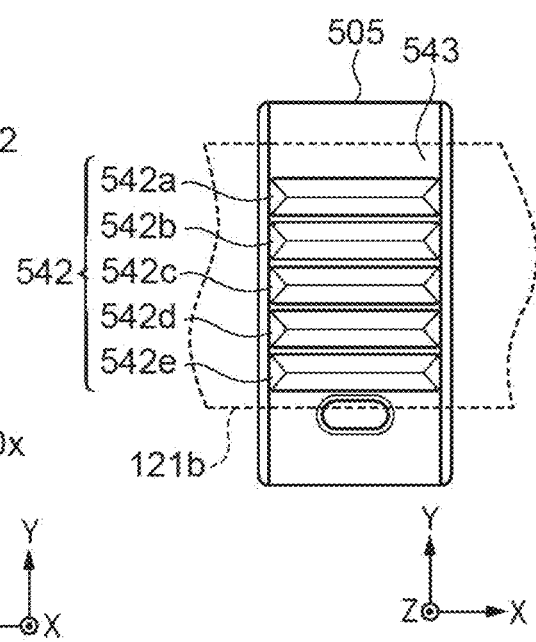

FIG. 11A is a perspective view of a cable clamp 505 which is the variation. FIG. 11B is a view of the cable clamp 505 as seen from the +X side. FIG. 11C is a view of a state in which the cable 150 and the belt member 121 are held by the cable clamp 505 as seen from the +X side. FIG. 11D is a view of the cable clamp 505 mounted on the belt member 121 as seen from the +Z side.

The cable clamp 505 differs from the cable clamp 504 (FIGS. 10A to 10C) in that the cable clamp 505 does not have the bent portions 541a and 541b and has a convex portion group 542 on the opposing surface 543. The convex portion group 542 includes a plurality of convex portions 542a to 542e. Each of the convex portions 542a to 542e is mountain-like rib projecting on the +Z side. A ridgeline of each of the convex portions 542a to 542e is substantially parallel to the direction of the X axis (the direction in which the main held portion 150x is extended).

As shown in FIG. 11C, in the state where the grip belt 120 is held by the cable clamp 505, the second belt portion 121b is located between the opposing surface 543 and the camera main body 100 in the direction of the Z axis. In this state, the second belt portion 121b is held at a position at which the second belt portion 121b is able to contact the convex portions 542a to 542e. Namely, as seen from the direction of the Z axis, the apexes of the convex portions 542a to 542e overlap the second belt portion 121b (FIG. 11D).

When the convex portions 542a to 542e are in contact with the second belt portion 121b, frictional force acts between the convex portions 542a to 542e and the second belt portion 121b. Thus, even if an unintended force is applied to the cable clamp 505 when, for example, the user puts the hand 529 into the grip belt 120, the displacement of the belt member 121 in the direction of the Y axis can be reduced. Moreover, the cable clamp 505 and the belt member 121 can be prevented from coming off each other.

It should be noted that from the viewpoint of increasing the frictional force between the cable clamp 505 and the belt member 121, the projecting amount w4 (FIG. 11C) by which convex portions 542a to 542e are projected from the opposing surface 543 is preferably large.

It should be noted that both the bent portions 541a and 541b and the grip belt housing 544 (FIG. 10A to FIG. 10C) and the convex portion group 542 (FIG. 11A to FIG. 11C) can be adopted for the cable clamp. In this case, between the first bent portion 541a and the second bent portion 541b in the direction of the Y axis, the second belt portion 121b is held at such a position as to be able to contact the convex portions 542a to 542e between the opposing surface 543 and the camera main body 100 in the direction of the Z axis. As a result, the displacement of the belt member 121 in the direction of the Y axis can be more effectively reduced. It should be noted that the second belt portion 121b may be held at such a position as to be able to contact at least one of the convex portions 542a to 542e.

Figure 12A:
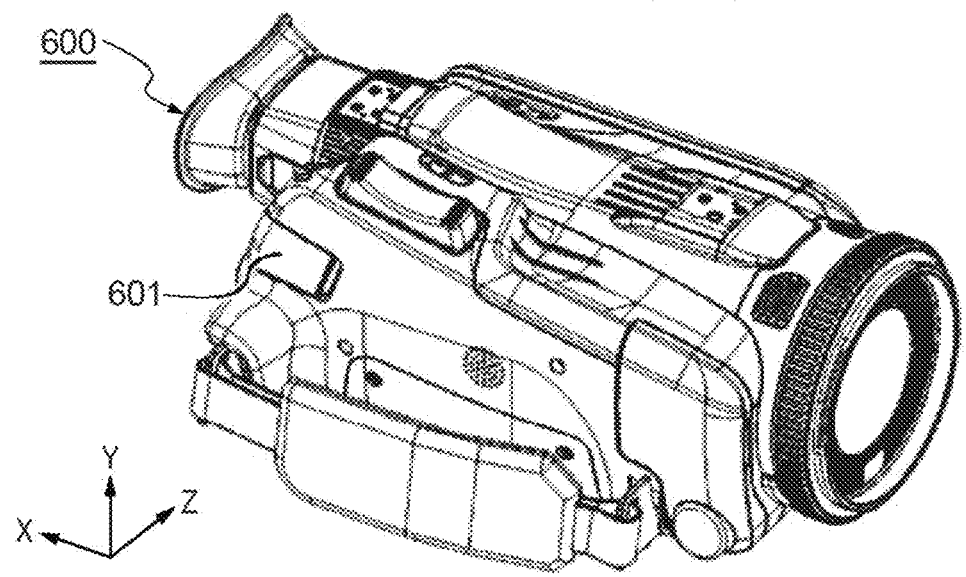
FIGS. 12A and 12B are perspective views of an image pickup apparatus according to a fourth embodiment.
Figure 12B:
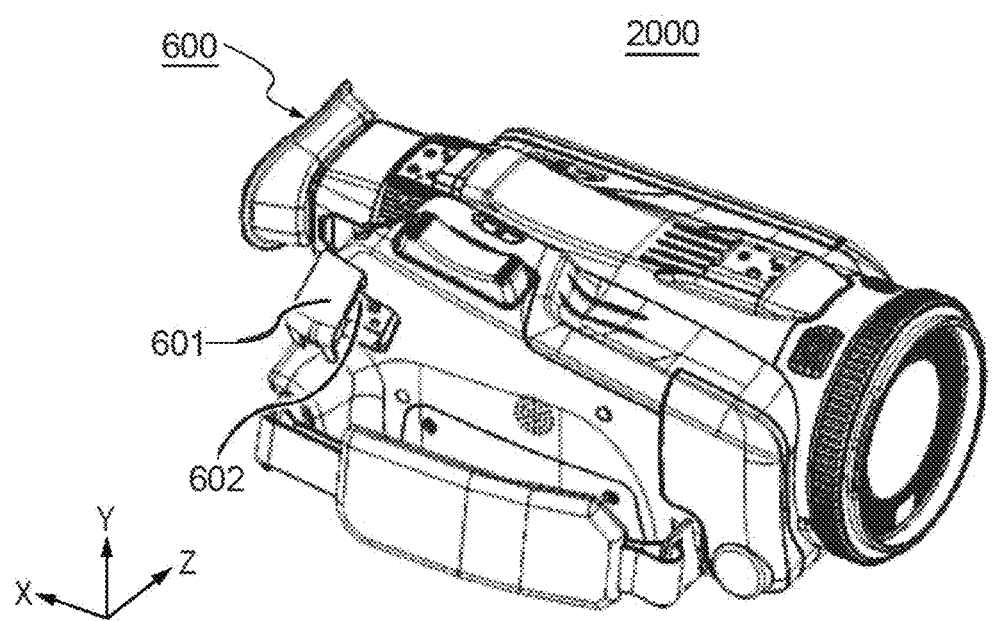

FIGS. 12A and 12B are perspective views of an image pickup apparatus 2000 according to a fourth embodiment of the present invention. The image pickup apparatus 2000 has a terminal cover 601, which is a cover unit for covering a power supply terminal 602 when closed, as well as a camera main body 600 (image pickup apparatus main body). It should be noted that the configurations in any of the first to third embodiments can be adopted as the configurations of a grip belt, a cable clamp, a battery, and so forth.

The terminal cover 601, the power supply terminal 602, and a cable 610 (FIG. 16) correspond to the rear terminal cover 115 (FIG. 1A, FIG. 1B), the power supply terminal 140 (FIG. 2A), and the cable 150, respectively, according to the first to third embodiments. The cable 610 is connectable to the power supply terminal 602.

The terminal cover 601 is openable and closable with respect to the camera main body 600. As will be described later, the terminal cover 601 is configured to, when closed, cover the power supply terminal 602, and when opened, open the power supply terminal 602 and never come off the camera main body 600. In FIG. 12A, the terminal cover 601 is closed (is in a closed state), and in FIG. 12B, the terminal cover 601 is opened (is in an open state). In FIG. 12A and FIG. 12B, the cable 610 has not yet been connected to the power supply terminal 602.

Figure 13A:
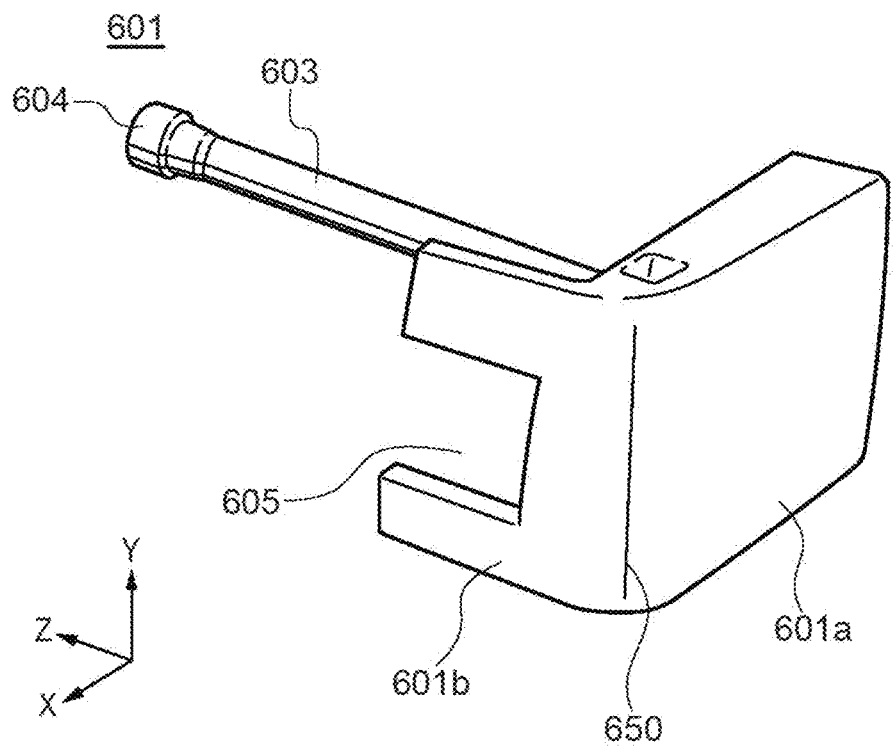
FIGS. 13A and 13B are a perspective view of a terminal cover and a view of the terminal cover as seen from a +X side, respectively.
Figure 13B:
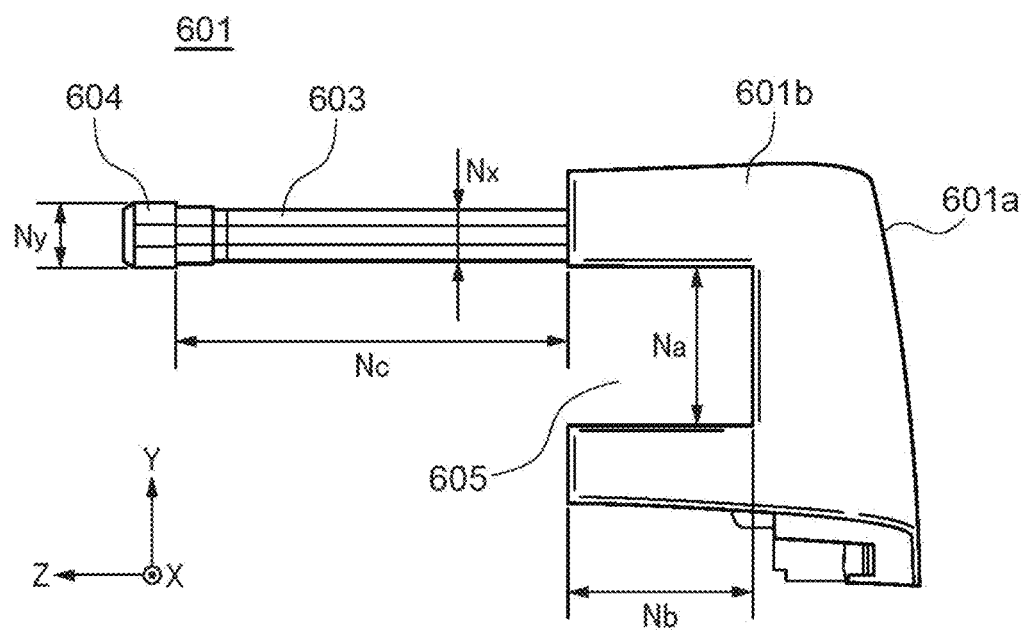
Figure 14:
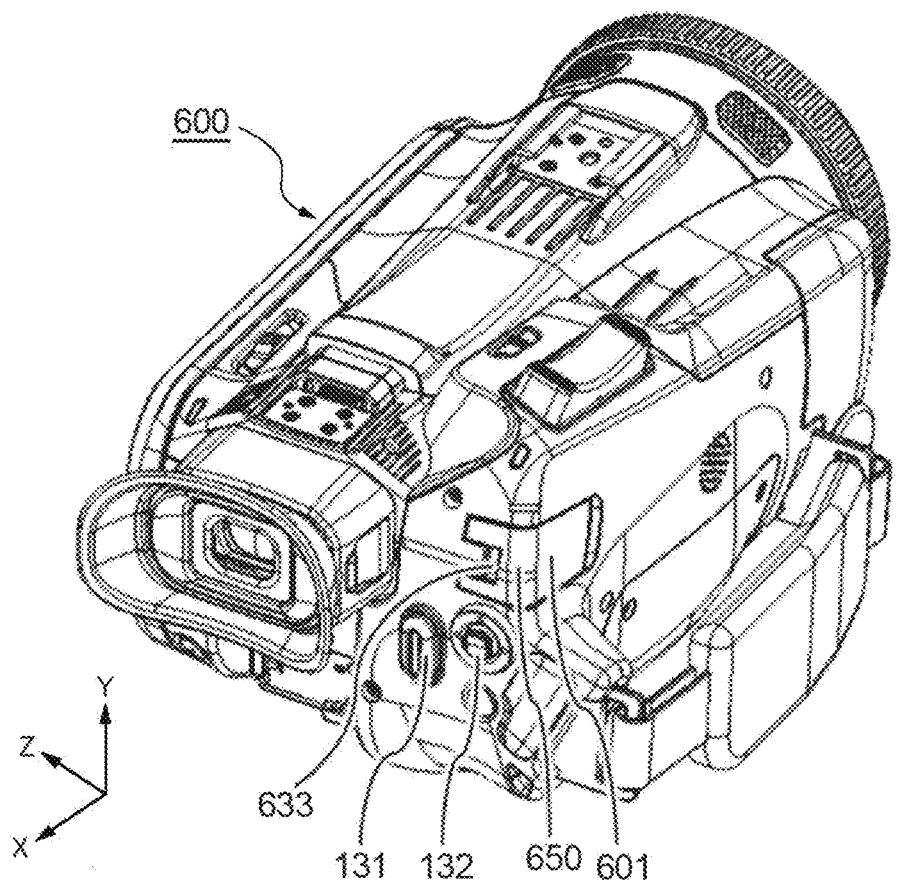
FIG. 14 is a perspective view of a camera main body as seen from a left rear side.

FIG. 13A is a perspective view of the terminal cover 601. FIG. 13B is a view of the terminal cover 601 as seen from the +X side. FIG. 14 is a perspective view of the camera main body 600 as seen from a left rear side. In FIG. 14, the cable 610 has not yet been connected to the power supply terminal 602, and the terminal cover 601 is closed.

When closed, the terminal cover 601 lies across two adjacent surfaces (a side surface on the −Z side and a rear surface) of the camera main body 600. That is, the terminal cover 601 has a side surface corresponding surface 601a and a rear surface corresponding surface 601b (FIG. 13A). A cutout 605 is formed in the rear surface corresponding surface 601b which is a portion corresponding to the rear surface of the camera main body 600. The cutout 605 is U-shaped as seen from the +X side. The side surface corresponding surface 601a and the rear surface corresponding surface 601b are connected together by a curved portion 650. It should be noted that the curved portion 650 is not absolutely necessary, but a chamfered portion may be provided in place of the curved portion 650.

A surface of the camera main body 600 which is opposed to the terminal cover 601 has a hollow 633 shown in FIG. 14, and the cutout 605 of the terminal cover 601 acts as a finger hook. For example, to open the terminal cover 601, the user inserts his or her finger into the hollow 633 and hooks the finger on the cutout 605 so that he or she can easily open the terminal cover 601.

Figure 15:
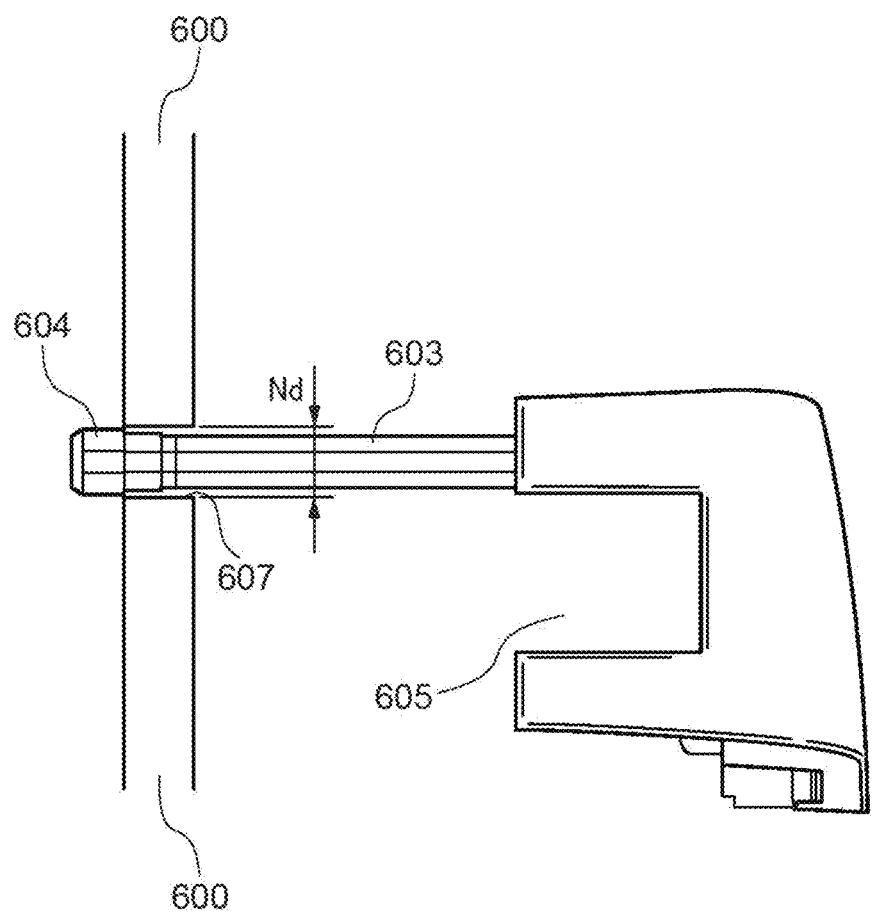
FIG. 15 is a view showing the terminal cover in a state of being prevented from coming off.

FIG. 15 is a view of a state in which the terminal cover 601 is in a state of being prevented from coming off the camera main body 600 as seen from the +X side.

The terminal cover 601 has an arm portion 603. The camera main body 600 is provided with a terminal cover connecting hole 607. The arm portion 603 is extended in the +Z direction. An end of the arm portion 603 in the +Z direction is formed as a cover retaining portion 604. The arm portion 603 and the cover retaining portion 604 are made of an elastic material. As shown in FIG. 13B, the outer diameter of a portion of the arm portion 603 except the cover retaining portion 604 is Nx. The outer diameter of the cover retaining portion 604 is Ny. The inner diameter of the terminal cover connecting hole 607 is Nd (FIG. 15). The magnitude relationship among the outer diameter Ny, the outer diameter Nx, and the inner diameter Nd is expressed by Ny>Nd≥Nx (or Ny>Nd>Nx).

The cover retaining portion 604 is inserted into the inside of the terminal cover connecting hole 607 of the camera main body 600. Since Ny>Nd, the cover retaining portion 604 is unlikely to come off the terminal cover connecting hole 607 in the −Z direction even if, for example, the terminal cover 601 is accidentally pulled in the −Z direction. Namely, since the cover retaining portion 604 is inserted into the inside of the camera main body 600 so as to be prevented from coming off the camera main body 600, the terminal cover 601 does not come off the camera main body 600.

The arm portion 603 is cylindrical column shaped. Therefore, the arm portion 603 is rotatable with respect to the terminal cover connecting hole 607 (the camera main body 600), and hence the terminal cover 601 is rotatable with respect to the terminal cover connecting hole 607 (the camera main body 600). The arm portion 603 is an elastic member, and is capable of being bent in an arbitrary direction. It should be noted that although in the present embodiment, the terminal cover 601, the arm portion 603, and the cover retaining portion 604 are configured as an integral unit, they may be separate components.

Figure 16:
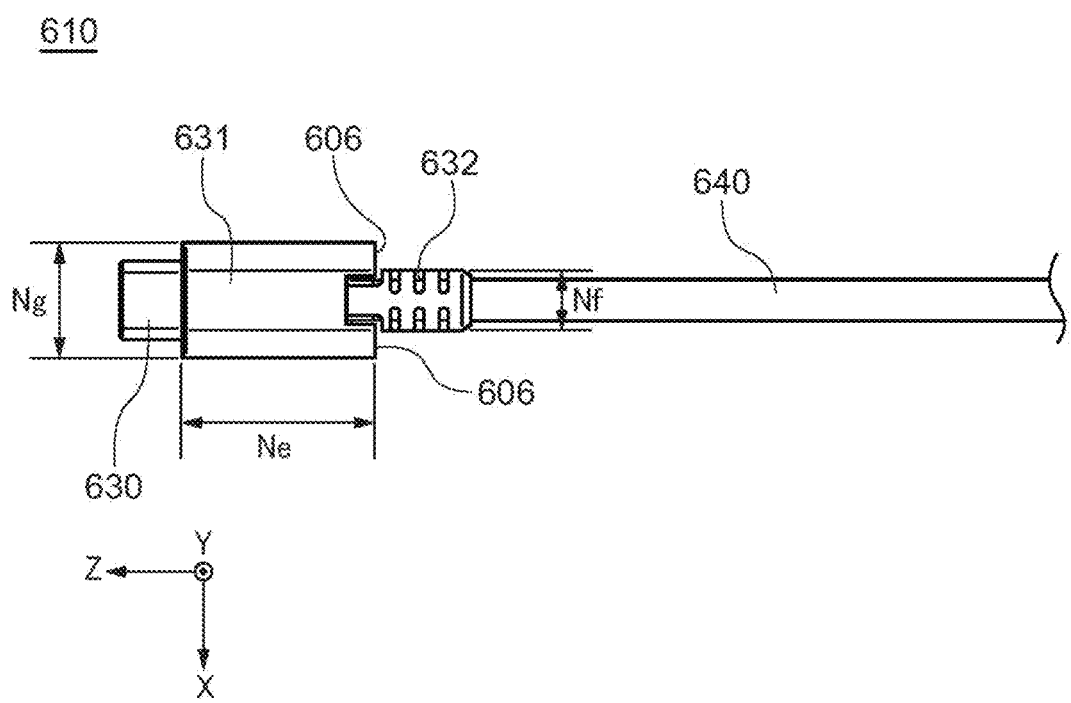
FIG. 16 is a view of a cable as seen from a +Y direction.

FIG. 16 is a view of the cable 610 as seen from the +Y direction. The cable 610 is attachable to and detachable from the power supply terminal 602 of the camera main body 600 (FIG. 12B). A cable terminal portion 630 is an electric contact disposed at an end of the cable 610 and connected to the power supply terminal 602 of the camera main body 600.

In the state where the cable terminal portion 630 of the cable 610 is connected to the power supply terminal 602, a cable holding portion 631, which is a first portion, and a holding portion adjoining portion 632, which is a second portion, lie side by side in this order, in order of proximity to the power supply terminal 602. The cable holding portion 631 and the holding portion adjoining portion 632 differ in size from each other. The holding portion adjoining portion 632 is also an end of a cable unit 640. The cable unit 640 is covered with an elastic member. The holding portion adjoining portion 632 is a bellows-like member disposed on the −Z side of the cable holding portion 631, and has a function of preventing the disconnection of the cable unit 640 when the cable unit 640 is bent.

Let Nf be the diameter of the holding portion adjoining portion 632. Let Ng be the diameter of the cable holding portion 631. The relationship between the diameter Nf and the diameter Ng is expressed by Ng>Nf. A hook portion 606 is a stepped surface that is formed due to the difference between the diameter Nf and the diameter Ng.

As shown in FIG. 13B, let Nc be the length (arm portion length) of an area in the arm portion 603 except the cover retaining portion 604. Let a cutout width Na be the length of the cutout 605 in the direction of the Y axis, and let a cut depth Nb be the length of the cutout 605 in the direction of the Z axis. The cutout width Na and the cut depth Nb are substantially the same as the diameter Nf of the holding portion adjoining portion 632 of the cable 610 (Na≈Nb≈Nf), and slightly larger than the diameter Nf.

Since Ng>Nf, Ng>Na and Ng>Nb hold. Thus, the cable holding portion 631 cannot penetrate the cutout 605, and the holding portion adjoining portion 632 can penetrate the cutout 605. Therefore, when the cable terminal portion 630 of the cable 610 is connected to the power supply terminal 602, the cutout 605 abuts against the cable holding portion 631 to function to prevent the cable terminal portion 630 from coming off the power supply terminal 602.

Furthermore, the holding portion length Ne (FIG. 16) of the cable holding portion 631 in the direction of the Z axis is substantially the same as the arm portion length Nc (FIG. 13B) of the arm portion 603 of the terminal cover 601 (Ne≈Nc). This configuration stabilizes the state of engagement between the cable holding portion 631 and the cutout 605, and makes it unlikely for the cable terminal portion 630 to come off the power supply terminal 602.

Figure 17A:
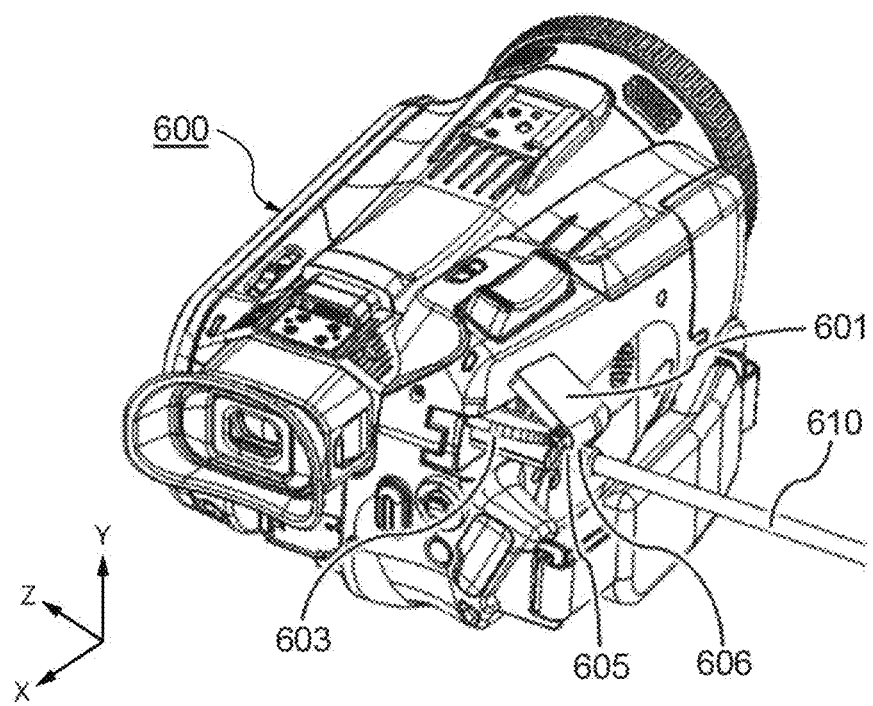
FIGS. 17A and 17B are perspective views of the image pickup apparatus with a power supply terminal to which the cable is connected.
Figure 17B:
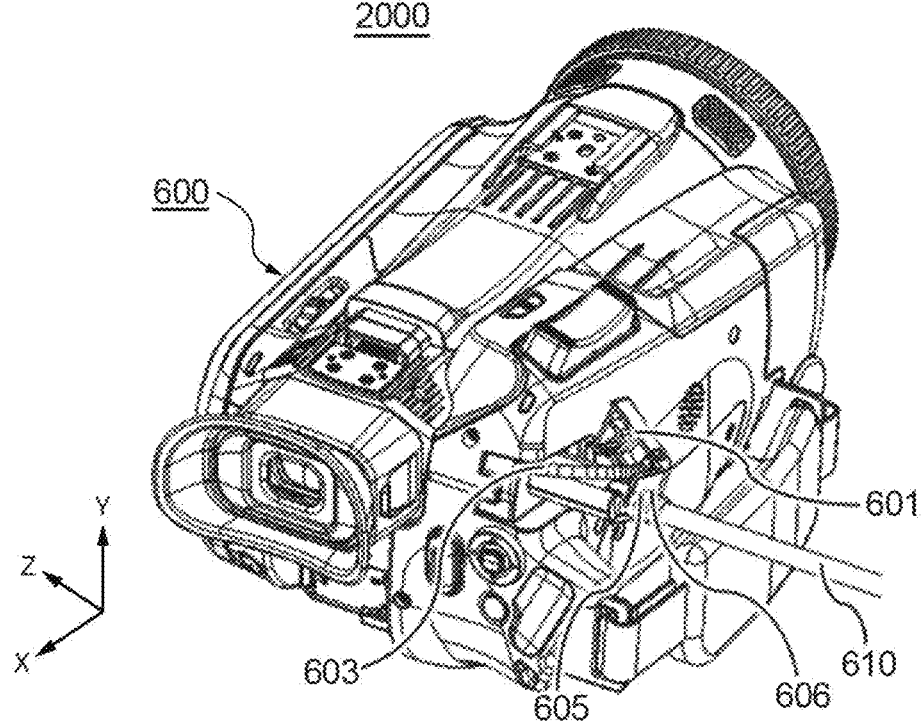

FIGS. 17A and 17B are perspective views of the image pickup apparatus 2000 with the power supply terminal 602 to which the cable 610 is connected. A description will now be given of the procedure according to which the user connects the cable 610 to the power supply terminal 602.

First, the user hooks his or her finger in the cutout 605 to open the terminal cover 601. At this time, it is easy to open the terminal cover 601 because of the hollow 633 and the cutout 605. After opening the terminal cover 601, the user inserts the cable terminal portion 630 into the exposed power supply terminal 602 (FIG. 12B) and connects the cable 610 to the power supply terminal 602. Then, the user hooks the cutout 605 of the terminal cover 601 (causes the cutout 605 to abut against) on the hook portion 606 of the cable 610. Since Ny>Nd, an area around the cutout 605 of the terminal cover 601 abuts against the cable holding portion 631 (the hook portion 606) of the cable 610, which performs the function of preventing the cable 610 from coming off. It should be noted that to detach the cable 610 from the power supply terminal 602, the user should reverse the connecting procedure.

According to the present embodiment, the effect similar to the effect of the first embodiment can be achieved in terms of preventing the cable 610 from coming off the power supply terminal 602 without complicated operations required.

Moreover, since the arm portion 603 is rotatable with respect to the terminal cover connecting hole 607, and in addition, the arm portion 603 is made of an elastic member and capable of bending in an arbitrary direction, the state of engagement between the cable holding portion 631 and the cutout 605 can be easily stabilized. For example, as shown in FIG. 17B, the cutout 605 of the terminal cover 601 is capable of sandwiching the cable 610 from an arbitrary direction in accordance with camera work. Thus, according to the present embodiment, the cable 610 is effectively prevented from coming off the power supply terminal 602 in many shooting postures.

Moreover, the cutout width Na of the cutout 605 is substantially the same as the diameter Nf of the holding portion adjoining portion 632 (Na≈Nf), which stabilizes the state in which the holding portion adjoining portion 632 is fitted in the cutout 605. As a result, it is possible to stabilize connection of the cable 610 to the power supply terminal 602.

Moreover, when closed, the terminal cover 601 lies across the two surfaces of the camera main body 600. Assuming that the terminal cover 601 is configured to lie correspondingly on only one surface of the camera main body 600, which requires to enlarge the surface area of the cutout 605, to protect the power supply terminal 602 and make it easier to hook a finger. In contrast, in the present embodiment, the terminal cover 601 lies across the two surfaces of the camera main body 600, and it is therefore possible to separately provide a surface that protects the power supply terminal 602 and a surface in which the cutout 605, which makes the surface area of each surface of the terminal cover 601 small. It should be noted that the two surfaces of the camera main body 600, on which the terminal cover 601 lies across, should not always be the surface on the −Z side and the surface on the +X side (the rear surface) but may be other surfaces.

It should be noted that in the present embodiment, Ng>Na and Ng>Nb hold. However, from the viewpoint of performing the function of preventing the cable 610 from coming off, Ng>Na or Ng>Nb has only to hold, and both of them do not necessarily have to hold.

It should be noted that the arm portion 603 should not always have a cylindrical column shape, but can have a polygonal prism shape. Even in a case where the arm portion 603 has a polygonal prism shape, the rotational position of the terminal cover 601 can be selected from a plurality of positions.

It should be noted that the configurations of the cutout 605 and the cable 610 in the present embodiment may be applied to any of the first to third embodiments.

It should be noted that the configuration in the third embodiment, in which the first bent portion 541a and the second 541b are provided, may also be adopted in any of the other embodiments other than the third embodiment.

It should be noted that the configuration in the third embodiment, in which the convex portions 542a to 542e are provided, can also be adopted in any of the other embodiments other than the third embodiment.

It should be noted that in each embodiment described above, an image pickup apparatus to which the present invention is applied may be an image pickup apparatus equipped with a grip belt and a cable clamp or an image pickup apparatus on which a grip belt and a cable clamp can be additionally mounted as separate components. Therefore, the camera main bodies 100 and 600 themselves may be regarded as image pickup apparatuses to which the present invention is applied.

It should be noted that in the embodiments described above, the word "substantially" does not exclude "completely". For example, substantially opposite, substantially parallel, substantially the same, substantially rectangular, and substantially C shape are concepts including completely opposite, completely parallel, completely the same, completely rectangular, and completely C shape.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-103893, filed Jun. 28, 2022, which is hereby incorporated by reference wherein in its entirety.

What is claimed is:

1. An image pickup apparatus comprising:
  an image pickup apparatus main body;
  a connecting terminal that is provided in the image pickup apparatus main body and to which a cable is electrically connected;

a grip belt that assists a user in holding the image pickup apparatus main body; and a cable clamp capable of being attached to and detached from the grip belt, wherein the cable clamp comprises:

a first holding portion that includes a U-shaped portion opened in a U shape and holds the grip belt; and a second holding portion that includes a U-shaped portion opened in a U shape and holds the cable, and wherein the U-shaped portion of the first holding portion and the U-shaped portion of the second holding portion are opened in different directions, and wherein in the first holding portion, a first wall on a side close to the image pickup apparatus main body and a second wall on a side far from the image pickup apparatus main body form the U shape, and the second holding portion is connected to the second wall.

2. The image pickup apparatus according to claim 1, wherein the U-shaped portion of the first holding portion includes a first insertion opening for insertion of the grip belt, the U-shaped portion of the second holding portion includes a second insertion opening for insertion of the cable, and the second insertion opening is opened on a side substantially opposite to a side on which the first insertion opening is opened.

3. The image pickup apparatus according to claim 2, wherein the first insertion opening of the first holding portion is tilted with respect to a width direction of a portion of the grip belt which is held by the first holding portion, and is opened in a direction including a component of a direction away from the image pickup apparatus main body.

4. The image pickup apparatus according to claim 1, wherein an end of the first wall is bent in a direction away from the image pickup apparatus main body.

5. The image pickup apparatus according to claim 4, wherein the second wall includes a convex portion projecting toward the image pickup apparatus main body, and a position of an end of the bent portion at the end of the first wall is located farther from the image pickup apparatus main body than a position of an end of the convex portion.

6. The image pickup apparatus according to claim 1, wherein the second wall includes a convex portion projecting toward the image pickup apparatus main body.

7. The image pickup apparatus according to claim 1, wherein the first holding portion and the second holding portion are disposed side by side in a width direction of a portion of the grip belt which is held by the first holding portion.

8. The image pickup apparatus according to claim 7, wherein a finger hook portion that has a concave-convex shape is formed in an outer side portion of the second holding portion.

9. The image pickup apparatus according to claim 7, wherein the second holding portion includes a plurality of holding areas for holding the plurality of cables, wherein the plurality of holding areas is disposed side by side in the width direction of the portion of the grip belt which is held by the first holding portion.

10. The image pickup apparatus according to claim 7, wherein in a thickness direction of the portion of the grip belt which is held by the first holding portion, a maximum outer diameter of the second holding portion is larger than a maximum outer diameter of a main part of the first holding portion.

11. The image pickup apparatus according to claim 1, wherein a surface of the first holding portion which is opposed to the image pickup apparatus main body is provided with a plurality of convex portions each having a ridgeline substantially parallel to a direction in which a portion of the grip belt which is held by the first holding portion is extended.

12. The image pickup apparatus according to claim 11, wherein a part of the grip belt is held in a portion surrounded by the U shape of the first holding portion, and the other part of the grip belt is held at such a position as to be able to contact at least one of the plurality of convex portions.

13. The image pickup apparatus according to claim 1, wherein a first bent portion bent in a direction approaching the image pickup apparatus main body is provided at a first end of the first holding portion in a width direction of a portion of the grip belt which is held by the first holding portion, and a second bent portion bent in a direction approaching the image pickup apparatus main body is provided at a second end of the first holding portion in the width direction, and a part of the grip belt is held in a portion surrounded by the U shape of the first holding portion, and between the first bent portion and the second bent portion, the other part of the grip belt is held between the image pickup apparatus main body and the first holding portion.

14. The image pickup apparatus according to claim 1, wherein a first bent portion bent in a direction approaching the image pickup apparatus main body is provided at a first end of the first holding portion in a width direction of a portion of the grip belt which is held by the first holding portion, and a second bent portion bent in a direction approaching the image pickup apparatus main body is provided at a second end of the first holding portion in the width direction, between the first bent portion and the second bent portion, a surface of the first holding portion which is opposed to the image pickup apparatus main body is provided with a plurality of convex portions each having a ridgeline substantially parallel to a direction in which a portion of the grip belt which is held by the first holding portion is extended, and a part of the grip belt is held in a portion surrounded by the U shape of the first holding portion, and between the first bent portion and the second bent portion, the other part of the grip belt is held at such a position as to be able to contact at least one of the plurality of convex portions between the image pickup apparatus main body and the first holding portion.

15. The image pickup apparatus according to claim 1, wherein the cable clamp is configured such that a direction in which a portion of the grip belt which is held by the first holding portion is extended and a direction in which a portion of the cable which is held by the second holding portion is extended are substantially parallel to each other.

16. The image pickup apparatus according to claim 1, wherein in a case where the cable has a portion held by the second holding portion and a thick portion thicker than the portion held by the second holding portion, the thick portion abuts against the second holding portion to restrict movement of the cable with respect to the second holding portion in a direction in which the cable is extended.

17. An image pickup apparatus comprising:
an image pickup apparatus main body;
a connecting terminal that is provided in the image pickup apparatus main body and to which a cable is electrically connected; and
a cover unit configured to be openable and closable with respect to the image pickup apparatus main body, wherein the cover unit is configured to, when closed, cover the connecting terminal, and when opened, open the connecting terminal and is configured not to come off the image pickup apparatus main body,
wherein a cutout is formed in the cover unit,
in a state in which the cable is connected to the connecting terminal, a first portion and a second portion in the cable, which differ in size from each other, lie side by side in this order, in order of proximity to the connecting terminal, wherein the first portion is incapable of penetrating the cutout and the second portion is capable of penetrating the cutout, and
when the cable is connected to the connecting terminal, the cutout abuts against the first portion to perform a function of preventing the cable from coming off the connecting terminal.

18. The image pickup apparatus according to claim 17, wherein
the cover unit comprises an arm portion, and
an end of the arm portion enters the image pickup apparatus main body to retain the cover unit, so that the cover unit from does not come off the connecting terminal.

19. The image pickup apparatus according to claim 18, wherein the arm portion is rotatable with respect to the image pickup apparatus main body.

20. The image pickup apparatus according to claim 18, wherein a length of the arm portion is substantially the same as a length of the first portion of the cable.

21. The image pickup apparatus according to claim 18, wherein the arm portion is made of an elastic member.

22. The image pickup apparatus according to claim 17, wherein a diameter of the second portion is substantially the same as a width of the cutout.

23. The image pickup apparatus according to claim 17, wherein when closed, the cover unit lies across two adjacent surfaces of the image pickup apparatus main body, and the cutout is formed in a portion corresponding to one of the two surfaces.

24. The image pickup apparatus according to claim 23, wherein the two surfaces of the image pickup apparatus main body comprise a side surface and a rear surface of the image pickup apparatus main body.

25. A cable clamp that is capable of being attached to and detached from a grip belt that assists a user in holding an image pickup apparatus main body, the cable clamp comprising:
a first holding portion including a U-shaped portion opened in a U shape; and
a second holding portion including a U-shaped portion opened in a U shape,
wherein the first holding portion is capable of holding the grip belt,
the second holding portion is capable of holding a cable electrically connected to a connecting terminal provided in the image pickup apparatus main body,
the U-shaped portion of the first holding portion and the U-shaped portion of the second holding portion are opened in different directions, and
in the first holding portion, a first wall on a side close to the image pickup apparatus main body and a second wall on a side far from the image pickup apparatus main body form the U shape, and the second holding portion is connected to the second wall.

* * * * *